United States Patent
Shimamura et al.

(10) Patent No.: US 8,715,074 B2
(45) Date of Patent: May 6, 2014

(54) GAME APPARATUS, INFORMATION PROCESSING APPARATUS, STORAGE MEDIUM HAVING GAME PROGRAM OR INFORMATION PROCESSING PROGRAM STORED THEREIN, GAME SYSTEM, DELAY MEASUREMENT SYSTEM, IMAGE DISPLAY METHOD, AUDIO OUTPUT METHOD, AND DELAY MEASUREMENT METHOD

(75) Inventors: Takayuki Shimamura, Kyoto (JP); Keizo Ohta, Kyoto (JP); Hitoshi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 373 days.

(21) Appl. No.: 13/287,278

(22) Filed: Nov. 2, 2011

(65) Prior Publication Data
US 2012/0172118 A1 Jul. 5, 2012

(30) Foreign Application Priority Data

Jan. 5, 2011 (JP) ................................ 2011-000551

(51) Int. Cl.
*A63F 9/24* (2006.01)
*A63F 13/00* (2014.01)

(52) U.S. Cl.
USPC ............................................. 463/31; 463/35

(58) Field of Classification Search
USPC ........... 463/1, 29–37, 40–43; 345/2.3; 381/58
See application file for complete search history.

(56) References Cited

U.S. PATENT DOCUMENTS

| | | | |
|---|---|---|---|
| 4,398,189 A * | 8/1983 | Pasierb et al. .................... | 463/33 |
| 4,580,134 A * | 4/1986 | Campbell et al. ............. | 345/589 |
| 6,011,590 A * | 1/2000 | Saukkonen ............... | 375/240.05 |
| 6,273,821 B1 * | 8/2001 | Moriguchi ...................... | 463/42 |
| 6,416,410 B1 * | 7/2002 | Abou-Samra et al. .......... | 463/31 |
| 7,115,031 B2 * | 10/2006 | Miyamoto et al. ................ | 463/1 |
| 7,126,584 B1 * | 10/2006 | Nishiumi et al. ............. | 345/161 |
| 7,338,376 B2 * | 3/2008 | Eck et al. ........................ | 463/42 |
| 7,671,916 B2 * | 3/2010 | Hashimoto ............. | 348/333.01 |
| 8,246,460 B2 * | 8/2012 | Kitahara ........................ | 463/37 |
| 2004/0176170 A1 * | 9/2004 | Eck et al. ........................ | 463/43 |
| 2009/0312106 A1 | 12/2009 | Okamura et al. | |
| 2010/0167816 A1 * | 7/2010 | Perlman et al. .................. | 463/30 |
| 2010/0253592 A1 * | 10/2010 | Slobodin et al. ............... | 345/2.3 |
| 2011/0190052 A1 * | 8/2011 | Takeda et al. .................. | 463/31 |
| 2011/0190061 A1 * | 8/2011 | Takeda et al. .................. | 463/39 |
| 2012/0088580 A1 * | 4/2012 | Takeda et al. .................. | 463/31 |

FOREIGN PATENT DOCUMENTS

JP 2009-297221 12/2009

* cited by examiner

*Primary Examiner* — Milap Shah
(74) *Attorney, Agent, or Firm* — Nixon & Vanderhye, P.C.

(57) ABSTRACT

An example game apparatus generates and outputs a predetermined test image to a television. A terminal device has its image pickup section acquire a pickup image of a screen of the television, and transmits the pickup image acquired by the image pickup section to the game apparatus. The game apparatus determines whether or not the pickup image includes the test image. When the pickup image is determined to include the test image, an image delay time is calculated on the basis of the time of the determination, the time of the output of the test image by the game apparatus, and a processing time between the acquisition of the pickup image and the determination. The game apparatus uses the image delay time to achieve synchronization between the terminal device and the television and also between image display and sound output of the television.

14 Claims, 18 Drawing Sheets

GAME APPARATUS, INFORMATION PROCESSING APPARATUS, STORAGE MEDIUM HAVING GAME PROGRAM OR INFORMATION PROCESSING PROGRAM STORED THEREIN, GAME SYSTEM, DELAY MEASUREMENT SYSTEM, IMAGE DISPLAY METHOD, AUDIO OUTPUT METHOD, AND DELAY MEASUREMENT METHOD

CROSS REFERENCE TO RELATED APPLICATION

The disclosure of Japanese Patent Application No. 2011-000551, filed Jan. 5, 2011, is incorporated herein by reference.

FIELD

This application describes a delay measurement system and method for measuring a display delay or sound output delay in a display device such as a television receiver, and also describes related technologies for use therewith, including a game apparatus, an information processing apparatus, a storage medium having a game program or information processing program stored therein, a game system, an image display method, and a sound output method.

BACKGROUND AND SUMMARY

Conventionally, there are game systems using television receivers (hereinafter, simply abbreviated as "televisions") as display devices. An example of such conventional game systems is a game system including a television and a game apparatus connected to the television. In this game system, game images generated by the game apparatus are displayed on the television and game sounds generated by the game apparatus are outputted from speakers of the television.

In the case of the game systems using televisions as display devices, there might be delays in displaying game images. Specifically, for the purpose of, for example, enhancement of the quality of images, recent digital televisions subject input images to various types of video processing, and display video-processed images. The video processing is generally time-consuming, and therefore, there might be a delay between the game apparatus outputting a game image to the television and the television displaying the game image. Accordingly, game systems using televisions as display devices have a problem of poor response of game displays to game operations.

Therefore, the present specification discloses a delay measurement system and method for measuring a delay in outputting an image or sound to a display device such as a television. The present specification also discloses a game apparatus, an information processing apparatus, a storage medium having a game program or information processing program stored therein, a game system, and an image display method which solve or reduce any problem to be caused by the delay as mentioned above.

(1) An example game system described herein includes a game apparatus and a portable display device.

The game apparatus includes an image generation section, an image output section, an image compression section, and an image transmission section. The image generation section sequentially generates first game images and second game images on the basis of a game process. The image output section sequentially outputs the first game images to a predetermined display device different from the portable display device. The image compression section sequentially compresses the second game images to sequentially generate compressed image data. The image transmission section sequentially transmits the compressed image data to the portable display device in a wireless manner.

The portable display device includes an image pickup section, an image reception section, an image decompression section, a display section, and an imaging data transmission section. The image reception section sequentially receives the compressed image data from the game apparatus. The image decompression section sequentially decompresses the compressed image data to acquire the second game images. The display section sequentially displays the second game images acquired through the decompression by the image decompression section. The imaging data transmission section transmits compressed imaging data to the game apparatus, the compressed imaging data being obtained by compressing a pickup image acquired by the image pickup section.

The game apparatus further includes an imaging data reception section, an image determination section, an image delay calculation section, and an image transmission control section. The imaging data reception section receives and decompresses the compressed imaging data to acquire the pickup image. The image determination section determines whether or not the pickup image acquired through the decompression by the imaging data reception section includes a predetermined first game image. When the pickup image is determined to include the predetermined first game image, the image delay calculation section calculates an image delay time between the image output section outputting the predetermined first game image and the predetermined display device displaying the predetermined first game image, on the basis of the time of the determination, the time of the output of the predetermined first game image by the image output section, and a processing time between the acquisition of the pickup image by the image pickup section and the determination. The image transmission control section delays the timing of transmitting the second game images to the portable display device, on the basis of the image delay time.

The "game apparatus" may be any information processing apparatus which performs a game process and generates a game image on the basis of the game process. The game apparatus may be an information processing apparatus for game use or a multipurpose information processing apparatus such as a general personal computer.

The "portable display device" corresponds to a terminal device 7 in an example embodiment to be described later, and also encompasses any device provided with features as mentioned above. Note that the term "portable" is intended to mean a size that allows the player to hold and move the device or arbitrarily change the position of the device.

The "game system" includes a game apparatus and a portable display device, and may or may not include a predetermined display device for displaying first game images. That is, the game system may or may not be provided in the form which includes the predetermined display device.

The "predetermined display device" encompasses any display device, such as a television in the example embodiment to be described later, which displays an input image after subjecting the image to some video processing.

The "predetermined first game image" is one of the first game images that is used for calculating the image delay time. Note that the concrete content of the predetermined first game image may be arbitrary, and the predetermined first game image may be a still image or one of a set of dynamic images.

According to the above configuration (1), the portable display device picks up a first game image displayed on the predetermined display device, and the pickup image is used to calculate the image delay time. As a result, a delay is measured on the basis of an actually displayed image, so that the image delay time can be accurately calculated. In addition, the game apparatus delays the timing of transmitting the second game images to the portable display device on the basis of the image delay time, so that the timing of displaying the game images can be equalized between the predetermined display device and the portable display device. Thus, according to the above configuration (1), it is possible to synchronize the timing of displaying game images between the predetermined display device and the portable display device, making it possible to solve any problem due to a display delay of the predetermined display device.

(2) The predetermined display device may include a speaker.

In this case, the game apparatus further includes a sound generation section, a sound output section, and a sound transmission section. The sound generation section generates a first game sound and a second game sound on the basis of the game process. The sound output section outputs the first game sound to the predetermined display device. The sound transmission section wirelessly transmits the second game sound to the portable display device.

The portable display device includes a sound reception section, a speaker, a microphone, and a detected sound transmission section. The sound reception section receives the second game sound from the game apparatus. The speaker outputs the second game sound. The detected sound transmission section transmits a sound detected by the microphone to the game apparatus.

The game apparatus further includes a detected sound reception section, a sound determination section, a sound delay calculation section, and a sound transmission control section. The detected sound reception section receives the detected sound. The sound determination section determines whether or not the detected sound received by the detected sound reception section includes a predetermined first game sound. When the detected sound is determined to include the predetermined first game sound, the sound delay calculation section calculates a sound delay time between the sound output section outputting the predetermined first game sound and the speaker of the predetermined display device outputting the predetermined first game sound, on the basis of the time of the determination, the time of the output of the predetermined first game sound by the sound output section, and a processing time between the detection of the sound by the microphone and the determination. The sound transmission control section delays the timing of transmitting the second game sound to the portable display device, on the basis of the sound delay time.

According to the above configuration (2), the portable display device detects a first game sound outputted to the predetermined display device, and the detected sound is used to calculate the sound delay time. As a result, a delay is measured on the basis of an actually outputted sound, so that the image delay time can be accurately calculated. In addition, the game apparatus delays the timing of transmitting the second game sound to the portable display device on the basis of the sound delay time, so that the timing of outputting the game sounds can be equalized between the predetermined display device and the portable display device. Thus, according to the above configuration (2), it is possible to synchronize the timing of outputting game sounds between the predetermined display device and the portable display device, making it possible to solve any problem due to a sound output delay of the predetermined display device.

(3) The image generation section may generate as the first game image or the second game image an image making a notification for prompting to direct the image pickup section of the portable display device toward a screen of the predetermined display device, and after the image is displayed on the predetermined display device or the portable display device, the image generation section may generate and display the predetermined first game image on the predetermined display device.

According to the above configuration (3), a notification is made for prompting to direct the image pickup section of the portable display device toward the screen of the predetermined display device before the predetermined first game image for use in measuring the image delay time is displayed. As a result, it is possible to prevent the image pickup section from not being directed toward the screen of the predetermined display device when the predetermined first game image is displayed, making it possible to prevent the image delay time from being measured inaccurately.

(4) The game apparatus may further include a storage section capable of storing a plurality of second game images. In this case, the image transmission control section stores the second game images generated by the image generation section to the storage section, and causes the image transmission section to transmit the second game images after a lapse of a standby time based on the image delay time since their generation.

The "storage section" may be any storage, such as a main memory or flash memory in the example embodiment to be described later, which can be accessed by the game apparatus. Note that the second game images to be stored in the storage section may be image data compressed by the image compression section or image data to be compressed later.

According to the above configuration (4), the game apparatus has the second game images stored therewithin, and transmits the second game images after a lapse of a standby time. Thus, it is possible to readily adjust the timing of transmitting the second game images.

(5) The image transmission control section may calculate a standby time until the second game image is transmitted to the portable display device, on the basis of the image delay time, and a time period between the second game image being generated and the portable display device displaying the second game image.

According the above configuration (5), the standby time is determined considering not only the image delay time but also the time period between the second game image being generated and the portable display device displaying the second game image. Thus, it is possible to accurately synchronize the timing of displaying the first game image with the timing of displaying the second game image.

(6) Another example game system described herein includes a game apparatus and a portable display device.

The game apparatus includes a sound generation section, a sound output section, and a sound transmission section. The sound generation section generates a first game sound and a second game sound on the basis of a game process. The sound output section outputs the first game sound to a predetermined display device different from the portable display device, the predetermined display device including a speaker. The sound transmission section wirelessly transmits the second game sound to the portable display device.

The portable display device includes a microphone, a sound reception section, a speaker, and a detected sound transmission section. The sound reception section receives the second game sound from the game apparatus. The speaker outputs the second game sound. The detected sound transmission section transmits a sound detected by the microphone to the game apparatus.

The game apparatus further includes a detected sound reception section, a sound determination section, a delay calculation section, and a sound transmission control section. The detected sound reception section receives the detected sound. The sound determination section determines whether or not the detected sound received by the detected sound reception section includes a predetermined first game sound. When the detected sound is determined to include the predetermined first game sound, the delay calculation section calculates a sound delay time between the sound output section outputting the predetermined first game sound and the speaker of the predetermined display device outputting the predetermined first game sound, on the basis of the time of the determination, the time of the output of the predetermined first game sound by the sound output section, and a processing time between the detection of the sound by the microphone and the determination. The sound transmission control section delays the timing of transmitting the second game sound to the portable display device, on the basis of the sound delay time.

The "predetermined first game sound" is one of the first game sounds that is used for calculating the sound delay time. Note that the concrete content of the predetermined first game sound may be arbitrary.

According to the above configuration (6), as in the above configuration (2), the portable display device detects a first game sound outputted to the predetermined display device, and the detected sound is used to calculate the sound delay time. As a result, a delay is measured on the basis of an actually outputted sound, so that the image delay time can be accurately calculated. In addition, the game apparatus delays the timing of transmitting the second game sound to the portable display device on the basis of the sound delay time, so that the timing of outputting the game sounds can be equalized between the predetermined display device and the portable display device. Thus, according to the above configuration (6), it is possible to synchronize the timing of outputting game sounds between the predetermined display device and the portable display device, making it possible to solve any problem due to a sound output delay of the predetermined display device.

(7) An example delay measurement system described herein measures a display delay of a predetermined display device for displaying an input image after subjecting the image to predetermined video processing. The delay measurement system includes an information processing apparatus capable of communicating with the predetermined display device and a portable terminal device capable of wirelessly communicating with the information processing apparatus.

The information processing apparatus includes an image generation section and a first image output section. The image generation section generates a predetermined image. The first image output section outputs the predetermined image to the predetermined display device.

The terminal device includes an image pickup section and a pickup image transmission section. The pickup image transmission section transmits a pickup image acquired by the image pickup section.

The information processing apparatus further includes a pickup image reception section, an image determination section, and an image delay calculation section. The pickup image reception section receives the pickup image. The image determination section determines whether or not the pickup image includes the predetermined image. When the pickup image is determined to include the predetermined image, the image delay calculation section calculates an image delay time between the first image output section outputting the predetermined image and the predetermined display device displaying the predetermined image, on the basis of the time of the determination, the time of the output of the predetermined image by the first image output section, and a processing time between the acquisition of the pickup image by the image pickup section and the determination.

The "information processing apparatus" may be any information processing apparatus provided with the function of generating images. For example, the "information processing apparatus" may be a game apparatus as in the example embodiment to be described later or may be a multipurpose information processing apparatus such as a general personal computer.

The "portable terminal device" is a terminal device provided with the function of displaying images and functioning as an operating device in the example embodiment to be described later, but the "portable terminal device" may be any device provided with features as mentioned above. Note that the term "portable" is intended to mean a size that allows the player to hold and move the device or arbitrarily change the position of the device.

The "delay measurement system" includes an information apparatus and a terminal device, and may or may not include a predetermined display device for displaying first images. That is, the delay measurement system may or may not be provided in the form which includes the predetermined display device.

The "predetermined image" is an image for use in calculating the image delay time. Note that the concrete content of the predetermined image may be arbitrary, and the predetermined image may be a still image or one of a set of dynamic images.

According to the above configuration (7), the portable display device picks up a predetermined image displayed on the predetermined display device, and the pickup image is used to calculate the image delay time. As a result, a delay is measured on the basis of an actually displayed predetermined image, so that the image delay time can be accurately calculated.

(8) The image generation section may sequentially generate first images to be displayed on the predetermined display device and second images to be displayed on the terminal device. In this case, the first image output section sequentially outputs the first images to the predetermined display device. The information processing apparatus further includes a second image output section for sequentially outputting the second images to the terminal device.

In addition, the terminal device further includes an image reception section and a display section. The image reception section sequentially receives the second images from the information processing apparatus. The display section sequentially displays the received second images.

The information processing apparatus further includes an image output control section for delaying the timing of outputting the second images to the terminal device, on the basis of the image delay time.

According to the above configuration (8), the information processing apparatus delays the timing of transmitting the second images to the portable display device, on the basis of the image delay time, so that the timing of displaying the images can be equalized between the predetermined display device and the portable display device. Thus, according to the above configuration (8), it is possible to synchronize the timing of displaying images between the predetermined display device and the portable display device, making it possible to solve any problem due to a display delay of the predetermined display device.

(9) The information processing apparatus may further include a sound generation section, a first sound output section, and a second sound output section. The sound generation section generates a first sound to be outputted to the predetermined display device and a second sound to be outputted to the terminal device. The first sound output section outputs the first sound to the predetermined display device. The second sound output section outputs the second sound to the terminal device.

In addition, the terminal device further includes a sound reception section and a speaker. The sound reception section receives the second sound from the information processing apparatus. The speaker outputs the second sound.

The information processing apparatus further includes a sound output control section for delaying the timing of outputting the second sound to the terminal device, on the basis of the image delay time.

According to the above configuration (9), the timing of outputting the second sound to the terminal device is adjusted on the basis of the image delay time. Thus, it is possible to synchronize both the timing of displaying images and the timing of outputting sounds between the predetermined display device and the portable display device. Moreover, according to the above configuration (9), it is not necessary to measure the sound delay time, and therefore, it is possible to achieve synchronization in terms of both images and sounds with a simplified process.

(10) The predetermined display device may include a speaker. In this case, the information processing apparatus further includes a sound generation section and a sound output section. The sound generation section generates a predetermined sound. The sound output section outputs the predetermined sound to the predetermined display device.

The terminal device includes a microphone and a detected sound transmission section for transmitting a sound detected by the microphone to the information processing apparatus.

The information processing apparatus further includes a detected sound reception section, a sound determination section, a sound delay calculation section, and an output control section. The detected sound reception section receives the detected sound. The sound determination section determines whether or not the detected sound received by the detected sound reception section includes the predetermined sound. When the detected sound is determined to include the predetermined sound, the sound delay calculation section calculates a sound delay time between the sound output section outputting the predetermined sound and the speaker of the predetermined display device outputting the predetermined sound, on the basis of the time of the determination, the time of the output of the predetermined sound by the sound output section, and a processing time between the detection of the sound by the microphone and the determination. The output control section delays at least one of the timing of outputting a sound by the sound output section and the timing of outputting an image by the image output section on the basis of the image delay time and the sound delay time, such that synchronization is achieved between display of the image on the predetermined display device and output of the sound from the speaker of the predetermined display device.

According to the above configuration (10), the information processing apparatus calculates an image delay time and a sound delay time, and on the basis of these delay times, the information processing apparatus adjusts the timing of displaying images on the predetermined display device and the timing of outputting sounds from the speaker of the predetermined display device. Thus, it is possible to synchronize these two timings in the predetermined display device, making it possible to prevent the user from being provided with a feeling of unnaturalness due to a display delay or sound output delay of the predetermined display device.

(11) Another example delay measurement system described herein measures a sound output delay of a speaker included in a predetermined display device. The delay measurement system includes an information processing apparatus capable of communicating with the predetermined display device and a portable terminal device capable of wirelessly communicating with the information processing apparatus.

The information processing apparatus includes a sound generation section and a first sound output section. The sound generation section generates a predetermined sound. The first sound output section outputs the predetermined sound to the predetermined display device.

The terminal device includes a microphone and a detected sound transmission section for transmitting a sound detected by the microphone to the information processing apparatus.

The information processing apparatus further includes a detected sound reception section, a sound determination section, and a sound delay calculation section. The detected sound reception section receives the detected sound. The sound determination section determines whether or not the detected sound received by the detected sound reception section includes the predetermined sound. When the detected sound is determined to include the predetermined sound, the sound delay calculation section calculates a sound delay time between the sound output section outputting the predetermined sound and the speaker of the predetermined display device outputting the predetermined sound, on the basis of the time of the determination, the time of the output of the predetermined sound by the sound output section, and a processing time between the detection of the sound by the microphone and the determination.

According to the above configuration (11), the portable display device detects a predetermined sound outputted from the speaker of the predetermined display device, and the detected sound is used to calculate the sound delay time. As a result, a delay is measured on the basis of an actually outputted predetermined sound, so that the sound delay time can be accurately calculated.

(12) The sound generation section may generate a first sound to be outputted to the predetermined display device and a second sound to be outputted to the terminal device. In this case, the first sound output section outputs the first sound to the predetermined display device. The information processing apparatus further includes a second sound output section for outputting the second sound to the terminal device.

The terminal device further includes a sound reception section and a speaker. The sound reception section receives the second sound from the information processing apparatus. The speaker outputs the received second sound.

The information processing apparatus further includes a sound output control section for delaying the timing of outputting the second sound to the terminal device, on the basis of the sound delay time.

According to the above configuration (12), the information processing apparatus delays the timing of transmitting the second sound to the portable display device, on the basis of the sound delay time, so that the timing of outputting sounds can be equalized between the predetermined display device and the portable display device. Thus, according to the above configuration (12), it is possible to synchronize the timing of outputting sounds between the predetermined display device and the portable display device, making it possible to solve any problem due to a sound output delay of the predetermined display device.

(13) The information processing apparatus may further include an image generation section, a first image output section, and a second image output section. The image generation section sequentially generates first images to be displayed on the predetermined display device and second images to be displayed on the terminal device. The first image output section sequentially outputs the first images to the predetermined display device. The second image output section sequentially outputs the second images to the terminal device.

The terminal device further includes an image reception section and a display section. The image reception section sequentially receives the second images from the information processing apparatus. The display section sequentially displays the received second images.

The information processing apparatus further includes an image output control section for delaying the timing of outputting the second images to the terminal device, on the basis of the sound delay time.

According to the above configuration (13), the timing of outputting the second images to the terminal device is adjusted on the basis of the sound delay time. Thus, it is possible to synchronize both the timing of outputting sounds and the timing of displaying images between the predetermined display device and the portable display device. Moreover, according to the above configuration (13), it is not necessary to measure the image delay time, and therefore, it is possible to achieve synchronization in terms of both images and sounds with a simplified process.

The present specification discloses example information processing apparatuses (game apparatuses) provided with features (excluding the image pickup section) of the game systems or delay measurement systems described in (1) to (13) above. Moreover, the present specification also discloses example non-transitory computer-readable storage media each having stored therein a game program or information processing program for causing computers of the information processing apparatuses to function as means equivalent to the features mentioned above. Furthermore, the present specification also discloses examples of an image display method, a sound output method, and a delay measurement method as performed in the game systems or delay measurement systems described in (1) to (13) above.

The game systems, delay measurement systems, etc., as described above, make it possible to calculate a display delay and/or a sound output delay in a predetermined display device. Moreover, by using the calculated delay(s), it is rendered possible to achieve synchronization between the predetermined display device and a portable display device and synchronization between image display and sound output in the predetermined display device.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of the Game System]

Figure 1:
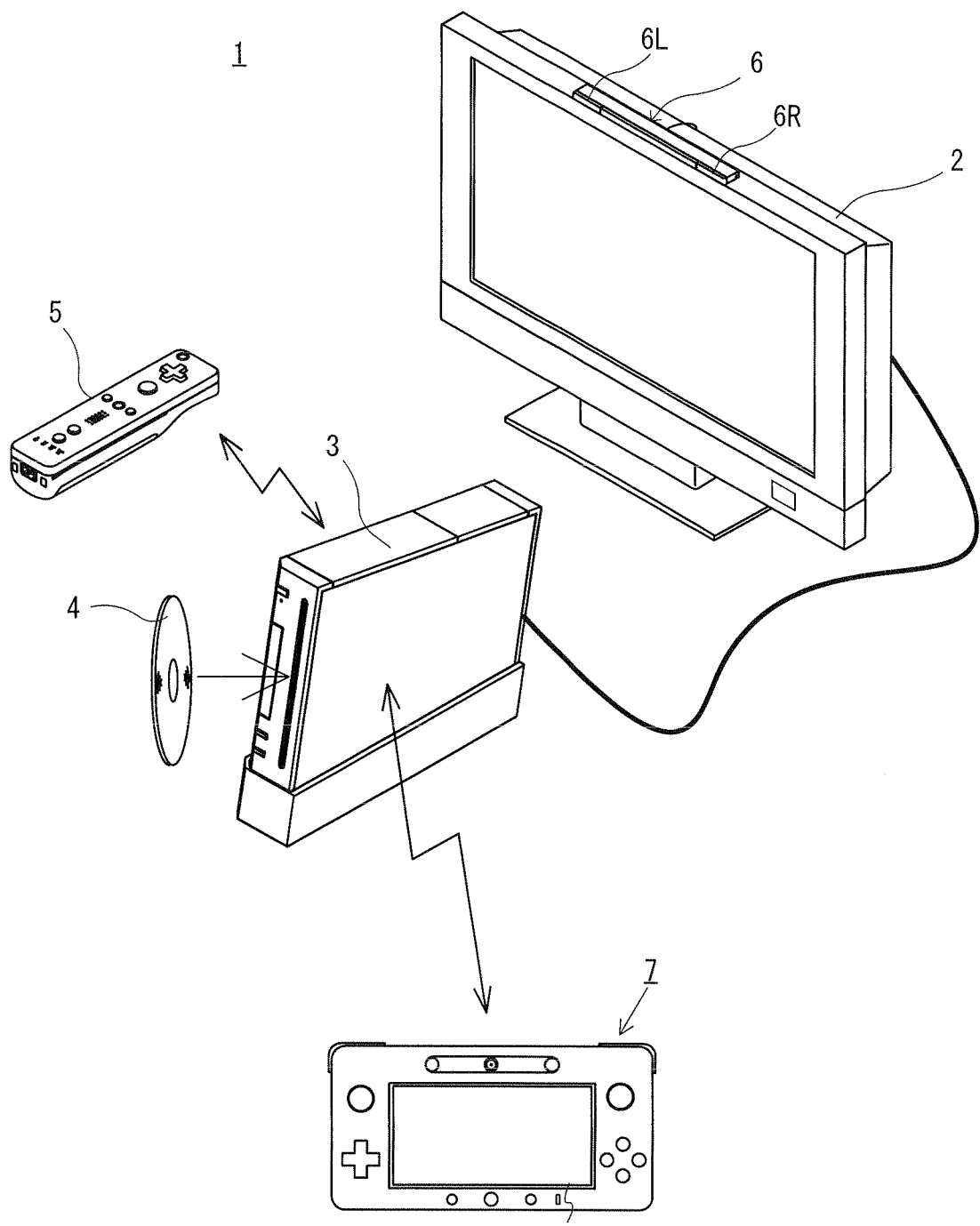
FIG. 1 is an external view of an example non-limiting game system.

An example game system according to an example embodiment will now be described with reference to the drawings. FIG. 1 is an external view of the game system 1. In FIG. 1, the game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (e.g., a game program) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes speakers 2a (see FIG. 2), and the speakers 2a output game sound acquired as a result of the game process. In alternative example embodiments, the game apparatus 3 and the stationary display device may be an integral unit. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected to the game apparatus 3, and the game apparatus 3 is able to control the lighting of each infrared LED of the marker device 6. Note that the marker device 6 is of a portable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in the present example embodiment, the game system 1 includes only one controller 5, but the game apparatus 3 is capable of communicating with a plurality of controllers, so that by using a predetermined number of controllers at the same time, a plurality of people can play the game. The configuration of the controller 5 will be described in detail later.

The terminal device 7 is of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 64 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

[2. Internal Configuration of the Game Apparatus 3]

Figure 2:
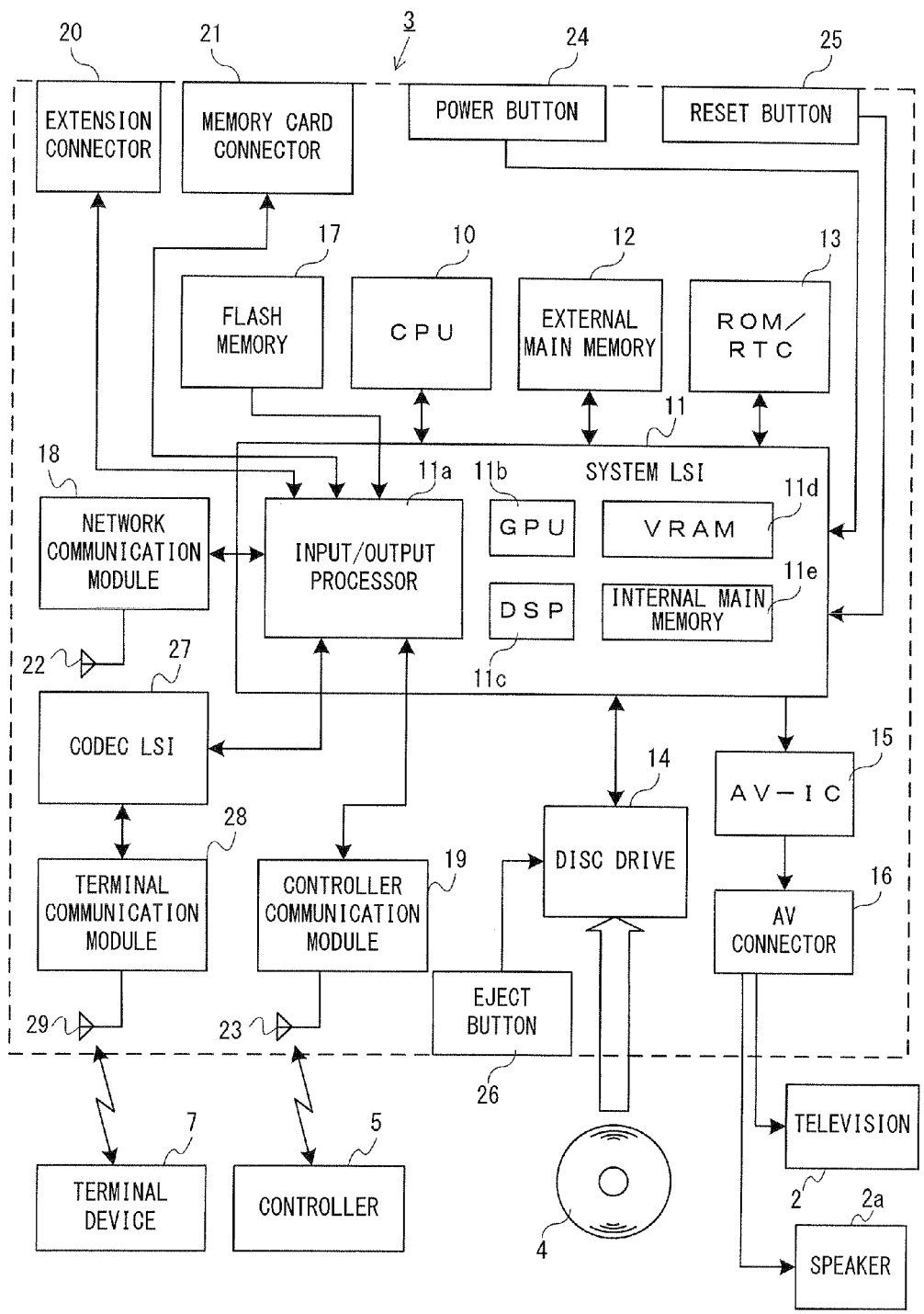
FIG. 2 is a block diagram illustrating an internal configuration of an example non-limiting game apparatus.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from flash memory 17, and various types of data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that in the present example embodiment, the game apparatus 3 generates both game images to be displayed on the television 2 and game images to be displayed on the terminal device 7. Hereinafter, the game images to be displayed on the television 2 are referred to as the "television game images" and the game images to be displayed on the terminal device 7 are referred to as the "terminal game images".

The DSP 11c, functioning as an audio processor, generates sound data using sound data and sound waveform (e.g., tone quality) data stored in one or both of the internal main memory 11e and the external main memory 12. Note that in the present example embodiment, the game sounds to be generated are classified into two types as in the case of the game images, one being outputted from the speaker of the television 2, the other being outputted from speakers of the terminal device 7. Hereinafter, in some cases, the game sounds to be outputted from the television 2 are referred to as "television game sounds", and the game sounds to be outputted from the terminal device 7 are referred to as "terminal game sounds".

Among the images and sounds generated by the game apparatus 3 as described above, both image data and sound data to be outputted from the television 2 are read out by the AV-IC 15. The AV-IC 15 outputs the read-out image data to the television 2 via an AV connector 16, and outputs the read-out sound data to the speakers 2a provided in the television 2. Thus, images are displayed on the television 2, and sounds are outputted from the speakers 2a.

Furthermore, among the images and sounds generated by the game apparatus 3, both image data and sound data to be outputted by the terminal device 7 are transmitted to the terminal device 7 by the input/output processor 11*a*, etc. The data transmission to the terminal device 7 by the input/output processor 11*a*, etc., will be described later.

The input/output processor 11*a* exchanges data with components connected thereto, and downloads data from an external device(s). The input/output processor 11*a* is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with external information processing apparatuses (e.g., other game apparatuses and various servers). Specifically, the input/output processor 11*a* can be connected to a network such as the Internet via the network communication module 18 and the antenna 22 to communicate with external information processing apparatuses connected to the network. The input/output processor 11*a* regularly accesses the flash memory 17, and detects the presence or absence of any data to be transmitted to the network, and when detected, transmits the data to the network via the network communication module 18 and the antenna 22. Further, the input/output processor 11*a* receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/output processor 11*a* receives operation data transmitted from the controller 5 via the antenna 23 and the controller communication module 19, and stores it (temporarily) in a buffer area of the internal main memory 11*e* or the external main memory 12.

Furthermore, the game apparatus 3 is capable of exchanging data, for images, sounds, etc., with the terminal device 7. When transmitting game images (terminal game images) to the terminal device 7, the input/output processor 11*a* outputs game image data generated by the GPU 11*b* to the codec LSI 27. The codec LSI 27 performs a predetermined compression process on the image data from the input/output processor 11*a*. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, delay may be avoided as much as possible in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11*a* outputs sound data generated by the DSP 11*c* to the terminal communication module 28 via the codec LSI 27. The codec LSI 27 performs a compression process on the sound data as it does on the image data. Any method can be employed for compressing the sound data, and such a method may use a high compression rate but may cause less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 10) or an instruction to control shooting by a camera (a camera 56 shown in FIG. 10). The input/output processor 11*a* transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various types of data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11*a*. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11*a* via the codec LSI 27. The input/output processor 11*a* stores the data received from the terminal device 7 (temporarily) in a buffer area of the internal main memory lie or the external main memory 12.

Furthermore, the game apparatus 3 can be connected to other devices or external storage media. Specifically, the input/output processor 11*a* is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

[3. Configuration of the Controller 5]

Figure 3:
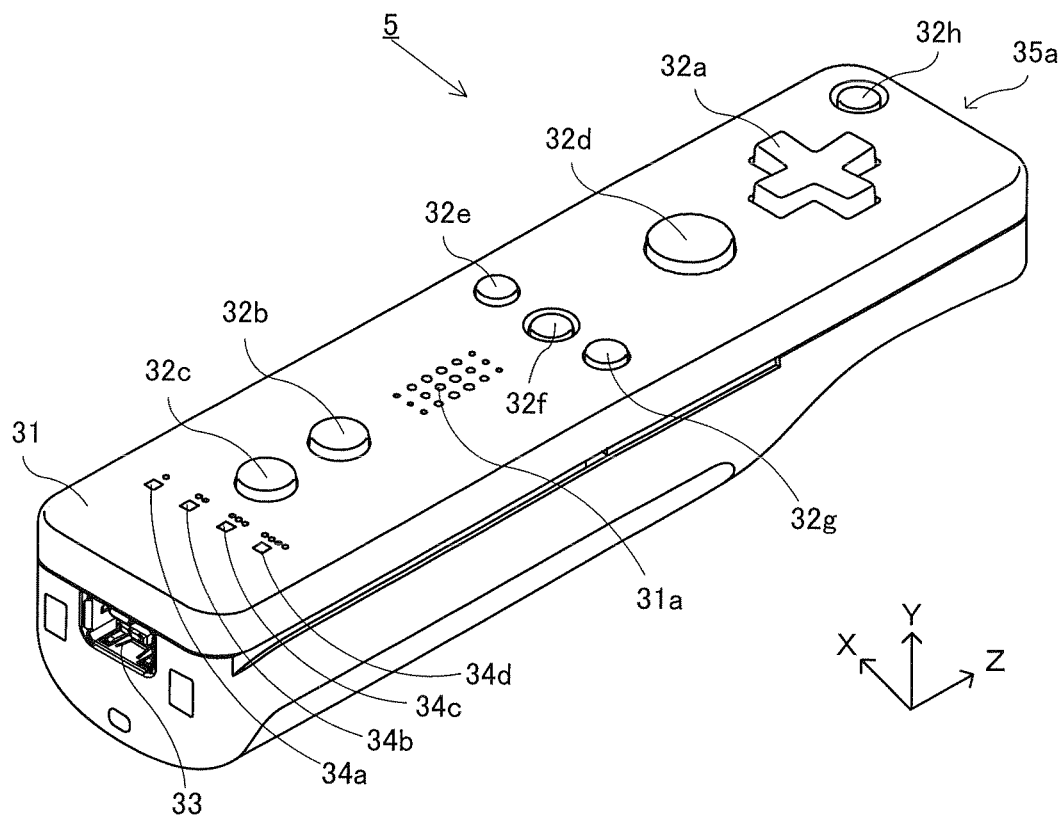
FIG. 3 is a perspective view illustrating an external configuration of an example non-limiting controller.
Figure 4:
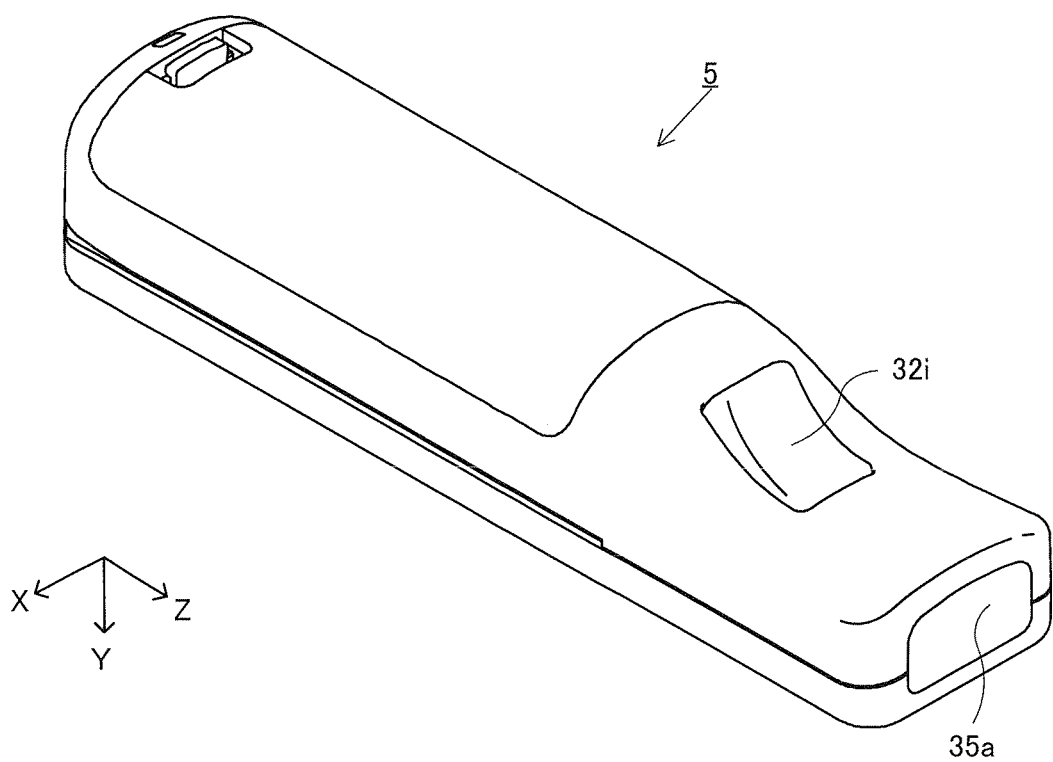
FIG. 4 is another perspective view illustrating an external configuration of the example non-limiting controller.

Next, with reference to FIGS. 3 to 7, the controller 5 will be described. FIG. 3 is a perspective view illustrating an external configuration of the controller 5. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the controller 5 to another device (e.g., another sensor unit or controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting sound from speakers 47 (shown in FIG. 5) incorporated in the controller 5 is provided between the first button 32b and the home button 32f.

Figure 5:
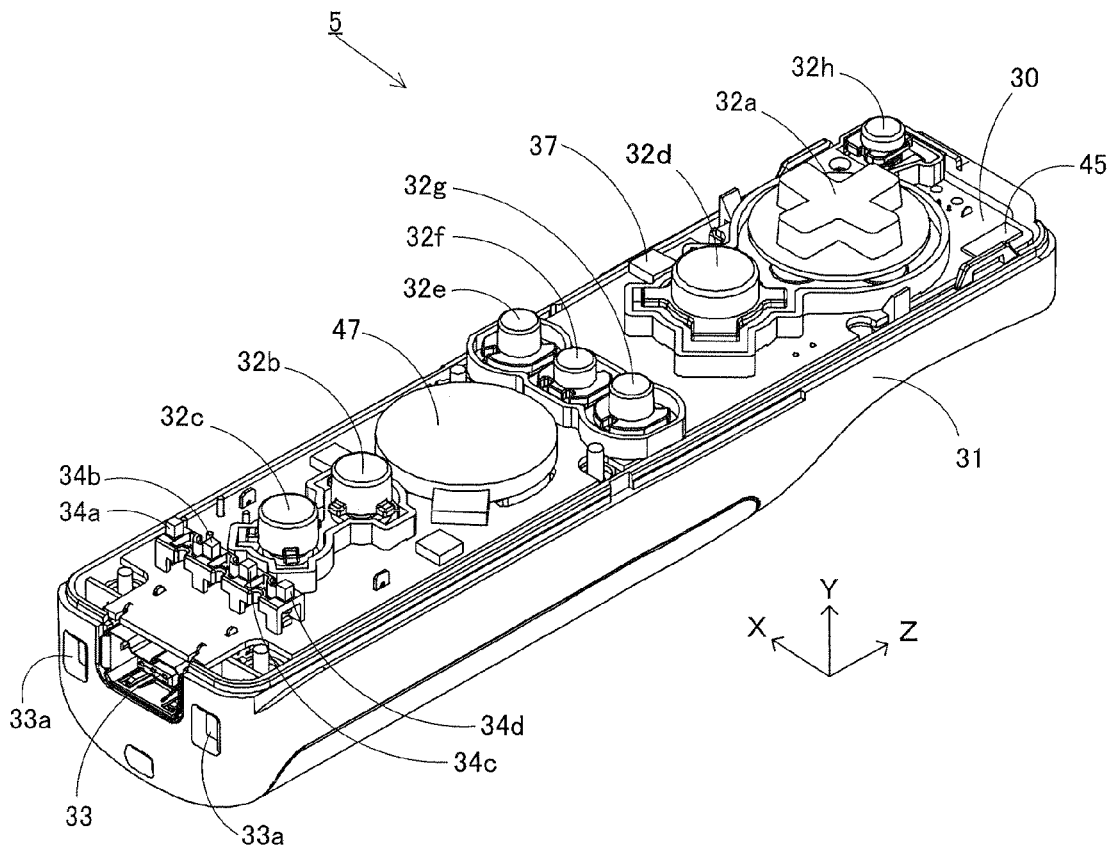
FIG. 5 is a diagram illustrating an internal configuration of the example non-limiting controller.
Figure 6:
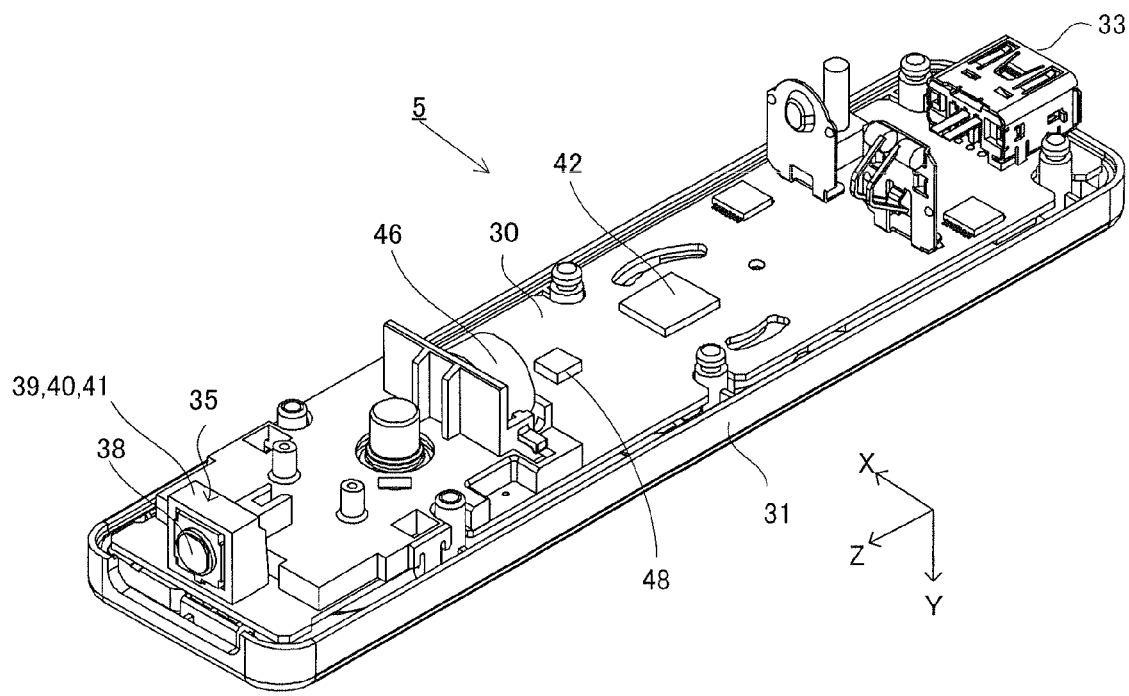
FIG. 6 is another diagram illustrating an internal configuration of the example non-limiting controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speakers 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the controller 5 with respect to the X-axis direction. Thus, calculation of the movement of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present example embodiment, the vibrator 46 is disposed slightly toward the front of the housing 31. That is, the vibrator 46 is positioned offset from the center toward the end of the controller 5, and therefore the vibration of the vibrator 46 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speakers 47, and the like.

FIGS. 3 to 6 only show examples of the shape of the controller 5, the shape of each operation button, the number and the positions of acceleration sensors and vibrators, and so on, and other shapes, numbers, and positions may be employed. Further, although in the present example embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
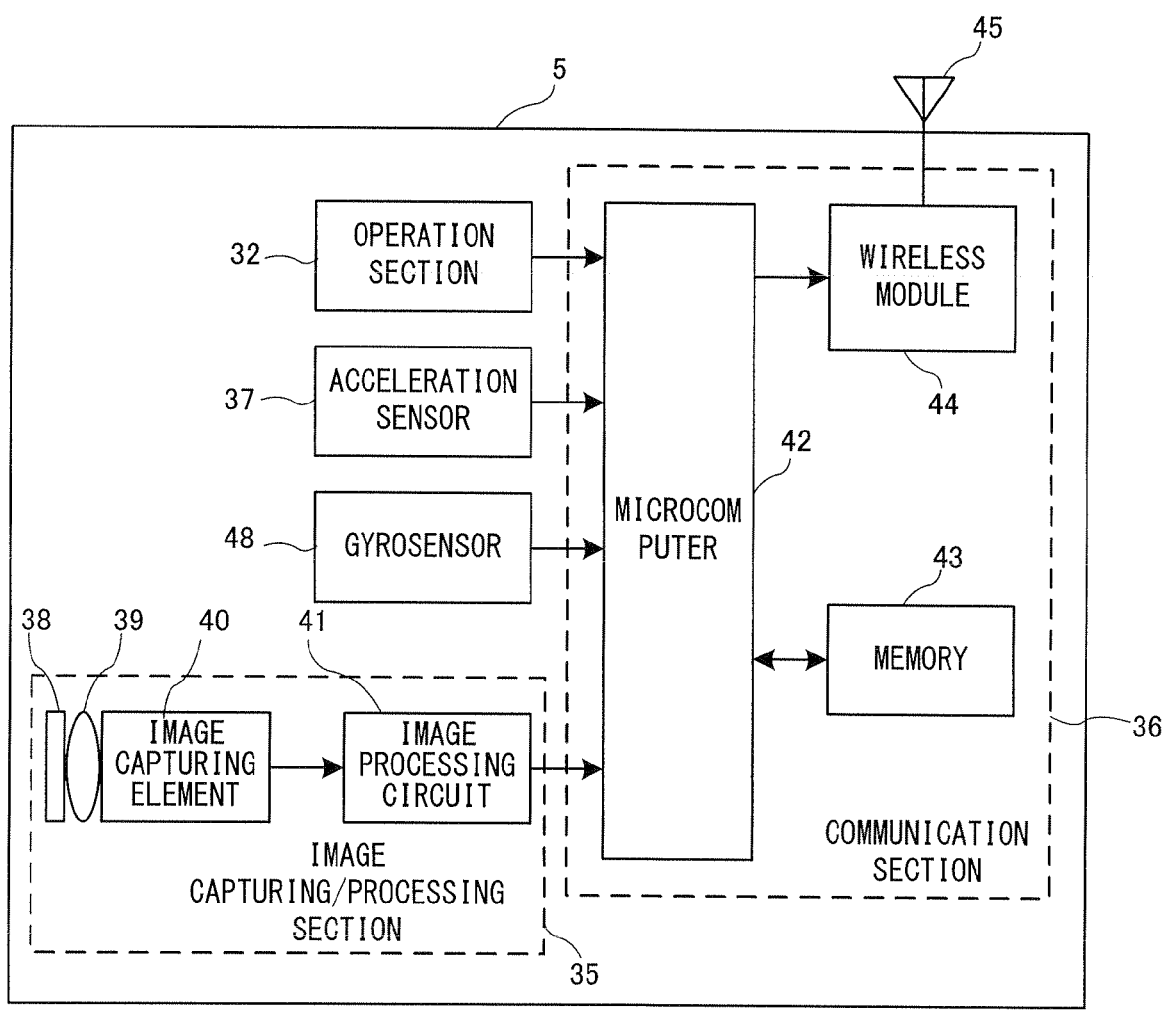
FIG. 7 is a block diagram illustrating a configuration of the example non-limiting controller.

FIG. 7 is a block diagram illustrating a configuration of the controller 5. The controller 5 includes an operating section 32 (the operation buttons 32a to 32i), the imaging information calculation section 35, a communication section 36, the acceleration sensor 37, and a gyroscope 48. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 63 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

Data outputted from the operating section 32, the imaging information calculation section 35, the acceleration sensor 37, and the gyroscope 48 to the microcomputer 42 is temporarily stored to the memory 43. The data is transmitted as operation data (controller operation data) to the game apparatus 3. Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data may be transmitted at a cycle of a shorter time period. The communication section 36 of the controller 5 outputs the operation data to the controller communication module 19 of the game apparatus 3 at intervals of, for example, 1/200 seconds.

As described above, the controller 5 can transmit marker coordinate data, acceleration data, angular rate data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the controller 5 to arbitrary attitudes, pointing the controller 5 to arbitrary positions on the screen, and moving the controller 5 itself.

Also, in the present example embodiment, the controller 5 is not provided with any display means for displaying game images, but the controller 5 may be provided with a display means for displaying an image or suchlike to indicate, for example, a remaining battery level.

[4. Configuration of the Terminal Device 7]

Figure 8:
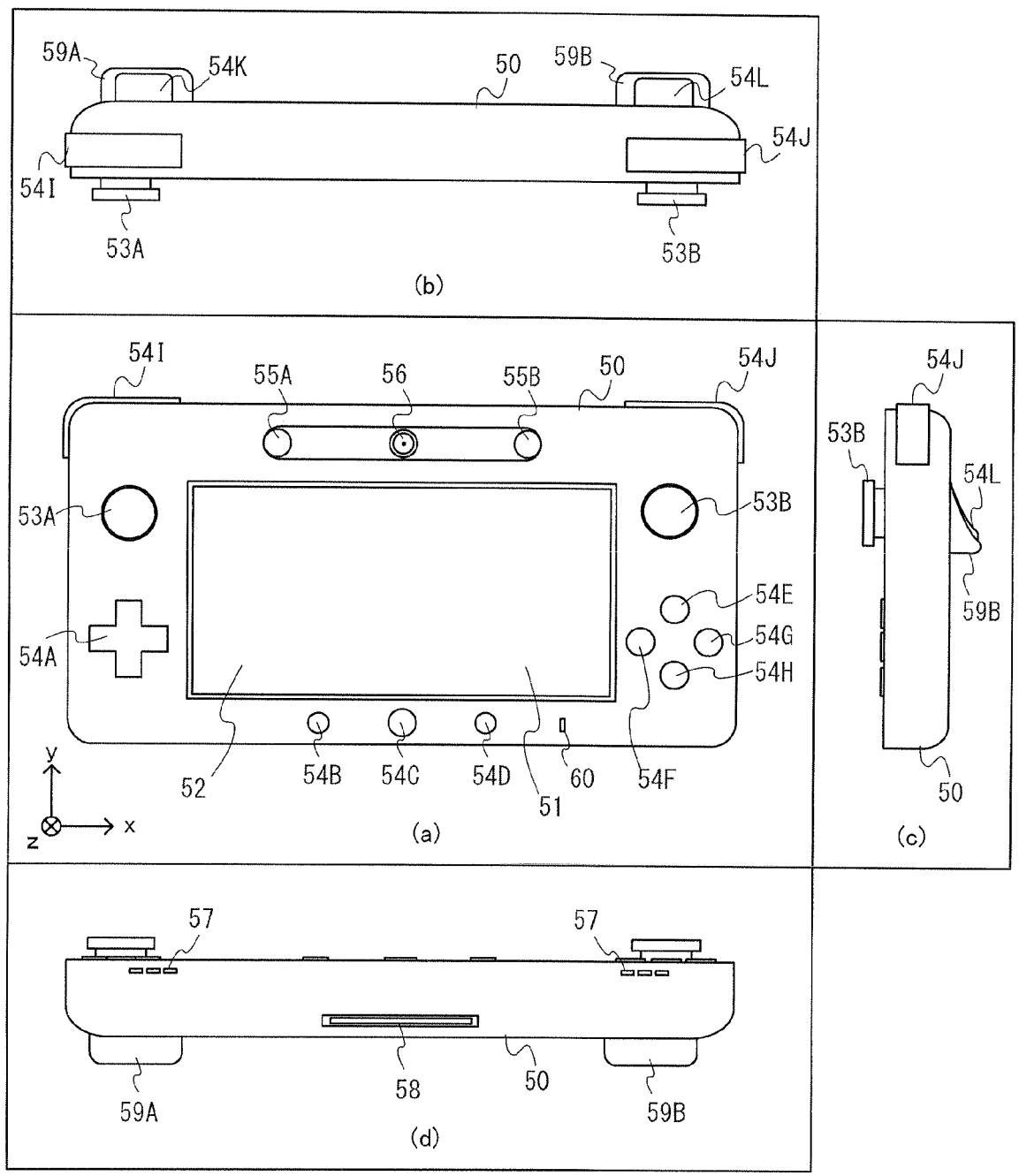
FIG. 8 is a diagram illustrating an external configuration of an example non-limiting terminal device.
Figure 9:
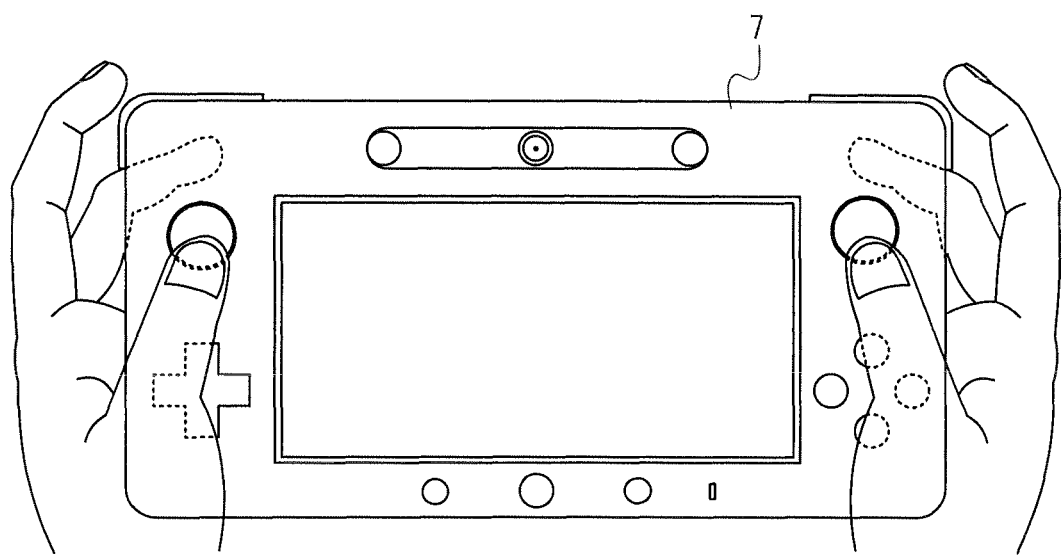
FIG. 9 is a diagram illustrating the example non-limiting terminal device being held by the user.
Figure 10:
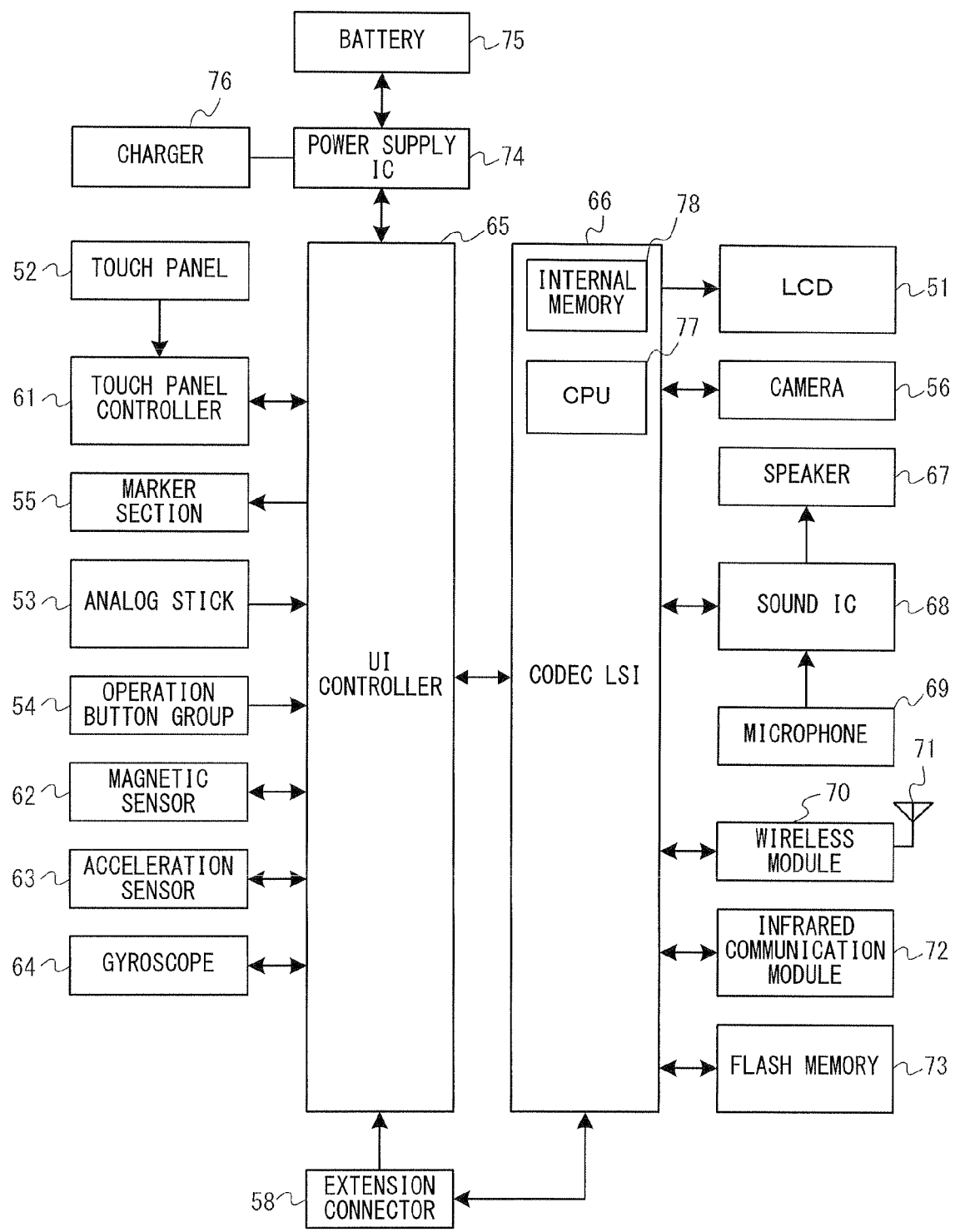
FIG. 10 is a block diagram illustrating an internal configuration of the example non-limiting terminal device.

Next, referring to FIGS. 8 to 10, the configuration of the terminal device 7 will be described. FIG. 8 provides views illustrating an external configuration of the terminal device 7. In FIG. 8, parts (a), (b), (c), and (d) are a front view, a top view, a right side view, and a bottom view, respectively, of the terminal device 7. FIG. 9 is a diagram illustrating the terminal device 7 being held by the user.

As shown in FIG. 8, the terminal device 7 has a housing 50 roughly shaped in the form of a horizontally rectangular plate. The housing 50 is sized to be held by the user. Thus, the user can hold and move the terminal device 7, and can change the position of the terminal device 7.

The terminal device 7 includes an LCD 51 on the front surface of the housing 50. The LCD 51 is provided approximately at the center of the surface of the housing 50. Therefore, the user can hold and move the terminal device while viewing the screen of the LCD 51 by holding the housing 50 by edges to the left and right of the LCD 51, as shown in FIG. 9. While FIG. 9 shows an example where the user holds the terminal device 7 horizontal (horizontally long) by holding the housing 50 by edges to the left and right of the LCD 51, the user can hold the terminal device 7 vertical (vertically long).

As shown in FIG. 8(*a*), the terminal device 7 includes a touch panel 52 on the screen of the LCD 51 as an operating means. In the present example embodiment, the touch panel 52 is a resistive touch panel. However, the touch panel is not limited to the resistive type, and may be of any type such as capacitive. The touch panel 52 may be single-touch or multi-touch. In the present example embodiment, a touch panel having the same resolution (detection precision) as the LCD 51 is used as the touch panel 52. However, the touch panel 52 and the LCD 51 are not always equal in resolution. While a stylus is usually used for providing input to the touch panel 52, input to the touch panel 52 can be provided not only by the stylus but also by the user's finger. Note that the housing 50 may be provided with an accommodation hole for accommodating the stylus used for performing operations on the touch panel 52. In this manner, the terminal device 7 includes the touch panel 52, and the user can operate the touch panel 52 while moving the terminal device 7. Specifically, the user can provide input directly to the screen of the LCD 51 (from the touch panel 52) while moving the screen.

As shown in FIG. 8, the terminal device 7 includes two analog sticks 53A and 53B and a plurality of buttons 54A to 54L, as operating means. The analog sticks 53A and 53B are devices capable of directing courses. Each of the analog sticks 53A and 53B is configured such that its stick portion to be operated with the user's finger is slidable (or tiltable) in an arbitrary direction (at an arbitrary angle in any of the up, down, left, right, and oblique directions) with respect to the surface of the housing 50. Moreover, the left analog stick 53A and the right analog stick 53B are provided to the left and the right, respectively, of the screen of the LCD 51. Accordingly, the user can provide an input for course direction using the analog stick with either the left or the right hand. In addition, as shown in FIG. 9, the analog sticks 53A and 53B are positioned so as to allow the user to manipulate them while holding the terminal device 7 at its left and right edges, and therefore the user can readily manipulate the analog sticks 53A and 53B while moving the terminal device 7 by hand.

The buttons 54A to 54L are operating means for providing predetermined input. As will be discussed below, the buttons 54A to 54L are positioned so as to allow the user to manipulate them while holding the terminal device 7 at its left and right edges (see FIG. 9). Therefore the user can readily manipulate the operating means while moving the terminal device 7 by hand.

As shown in FIG. 8(*a*), of all the operation buttons 54A to 54L, the cross button (direction input button) 54A and the buttons 54B to 54H are provided on the front surface of the housing 50. That is, these buttons 54A to 54G are positioned so as to allow the user to manipulate them with his/her thumbs (see FIG. 9).

The cross button 54A is provided to the left of the LCD 51 and below the left analog stick 53A. That is, the cross button 54A is positioned so as to allow the user to manipulate it with his/her left hand. The cross button 54A is a cross-shaped button which makes it possible to specify at least up, down, left and right directions. Also, the buttons 54B to 54D are provided below the LCD 51. These three buttons 54B to 54D are positioned so as to allow the user to manipulate them with either hand. Moreover, the four buttons 54E to 54H are provided to the right of the LCD 51 and below the right analog stick 53B. That is, the four buttons 54E to 54H are positioned so as to allow the user to manipulate them with the right hand. In addition, the four buttons 54E to 54H are positioned above, to the left of, to the right of, and below the central position among them. Therefore, the four buttons 54E to 54H of the terminal device 7 can be used to function as buttons for allowing the user to specify the up, down, left and right directions.

Furthermore, as shown in FIGS. 8(*a*), 8(*b*) and 8(*c*), the first L button 54I and the first R button 54J are provided at the upper (left and right) corners of the housing 50. Specifically, the first L button 54I is provided at the left edge of the top surface of the plate-like housing 50 so as to be exposed both from the top surface and the left-side surface. The first R button 54J is provided at the right edge of the top surface of the housing 50 so as to be exposed both from the top surface and the right-side surface. Thus, the first L button 54I is positioned so as to allow the user to manipulate it with the left index finger, and the first R button 54J is positioned so as to allow user to manipulate it with the right index finger (see FIG. 9).

Also, as shown in FIGS. 8(*b*) and 8(*c*), the second L button 54K and the second R button 54L are positioned at stands 59A and 59B, respectively, which are provided on the back surface of the plate-like housing 50 (i.e., the plane opposite to the surface where the LCD 51 is provided). The second L button 54K is provided at a comparatively high position on the right side of the back surface of the housing 50 (i.e., the left side as viewed from the front surface side), and the second R button 54L is provided at a comparatively high position on the left side of the back surface of the housing 50 (i.e., the right side as viewed from the front surface side). In other words, the second L button 54K is provided at a position approximately opposite to the left analog stick 53A provided on the front surface, and the second R button 54L is provided at a position approximately opposite to the right analog stick 53B provided on the front surface. Thus, the second L button 54K is positioned so as to allow the user to manipulate it with the left middle finger, and the second R button 54L is positioned so as to allow the user to manipulate it with the right middle finger (see FIG. 9). In addition, the second L button 54K and the second R button 54L are provided on the surfaces of the stands 59A and 59B that are directed obliquely upward, as shown in FIG. 8(*c*), and therefore, the second L button 54K and the second R button 54L have button faces directed obliquely upward. When the user holds the terminal device 7, the middle fingers will probably be able to move in the up/down direction, and therefore the button faces directed upward will allow the user to readily press the second L button 54K and the second R button 54L. Moreover, providing the stands on the back surface of the housing 50 allows the user to readily hold the housing 50, and furthermore, providing the buttons on the stands allows the user to readily manipulate the buttons while holding the housing 50.

Note that the terminal device 7 shown in FIG. 8 has the second L button 54K and the second R button 54L provided at the back surface, and therefore when the terminal device 7 is placed with the screen of the LCD 51 (the front surface of the housing 50) facing up, the screen might not be completely horizontal. Accordingly, in another example embodiment, three or more stands may be formed on the back surface of the housing 50. As a result, when the terminal device 7 is placed on the floor with the screen of the LCD 51 facing upward, all the stands contact the floor, so that the screen can be horizontal. Alternatively, the terminal device 7 may be placed horizontally by adding a detachable stand.

The buttons 54A to 54L are each appropriately assigned a function in accordance with the game program. For example, the cross button 54A and the buttons 54E to 54H may be used for direction-specifying operations, selection operations, etc., whereas the buttons 54B to 54E may be used for setting operations, cancellation operations, etc.

Although not shown in the figures, the terminal device 7 includes a power button for turning ON/OFF the terminal device 7. Moreover, the terminal device 7 may also include buttons for turning ON/OFF the screen of the LCD 51, performing a connection setting (pairing) with the game apparatus 3, and controlling the volume of speakers (speakers 67 shown in FIG. 10).

As shown in FIG. 8(*a*), the terminal device 7 has a marker section (a marker section 55 shown in FIG. 10), including markers 55A and 55B, provided on the front surface of the housing 50. The marker section 55 is provided in the upper portion of the LCD 51. The markers 55A and 55B are each formed by one or more infrared LEDs, as are the markers 6R and 6L of the marker device 6. The marker section 55 is used for the game apparatus 3 to calculate the movement, etc., of the controller 5, as is the marker device 6 described above. In addition, the game apparatus 3 can control the lighting of the infrared LEDs included in the marker section 55.

The terminal device 7 includes the camera 56 which is an image pickup means. The camera 56 includes an image pickup element (e.g., a CCD image sensor, a CMOS image sensor, or the like) having a predetermined resolution, and a lens. As shown in FIG. 8, in the present example embodiment, the camera 56 is provided on the front surface of the housing 50. Therefore, the camera 56 can pick up an image of the face of the user holding the terminal device 7, and can pick up an image of the user playing a game while viewing the LCD 51, for example.

Note that the terminal device 7 includes a microphone (microphone 69 shown in FIG. 10) which is a sound input means. A microphone hole 60 is provided in the front surface of the housing 50. The microphone 69 is provided inside the housing 50 behind the microphone hole 60. The microphone detects sound around the terminal device 7 such as the voice of the user.

The terminal device 7 includes speakers (speakers 67 shown in FIG. 10) which are sound output means. As shown in FIG. 8(*d*), speaker holes 57 are provided in the bottom surface of the housing 50. Sound emitted by the speakers 67 is outputted from the speaker holes 57. In the present example embodiment, the terminal device 7 includes two speakers, and the speaker holes 57 are provided at positions corresponding to the left and right speakers.

Also, the terminal device 7 includes an expansion connector 58 for connecting another device to the terminal device 7. In the present example embodiment, the expansion connector 58 is provided at the bottom surface of the housing 50, as shown in FIG. 8(*d*). Any additional device may be connected to the expansion connector 58, including, for example, a game-specific controller (a gun-shaped controller or suchlike) or an input device such as a keyboard. The expansion connector 58 may be omitted if there is no need to connect any additional devices to terminal device 7.

Note that as for the terminal device 7 shown in FIG. 8, the shapes of the operation buttons and the housing 50, the number and arrangement of components, etc., are merely illustrative, and other shapes, numbers, and arrangements may be employed.

Next, an internal configuration of the terminal device 7 will be described with reference to FIG. 10. FIG. 10 is a block diagram illustrating the internal configuration of the terminal device 7. As shown in FIG. 10, in addition to the components shown in FIG. 8, the terminal device 7 includes a touch panel controller 61, a magnetic sensor 62, the acceleration sensor 63, the gyroscope 64, a user interface controller (UI controller) 65, a codec LSI 66, the speakers 67, a sound IC 68, the microphone 69, a wireless module 70, an antenna 71, an infrared communication module 72, flash memory 73, a power supply IC 74, and a battery 75. These electronic components are mounted on an electronic circuit board and accommodated in the housing 50.

The UI controller 65 is a circuit for controlling the input/output of data to/from various input/output sections. The UI controller 65 is connected to the touch panel controller 61, an analog stick section 53 (including the analog sticks 53A and 53B), an operation button group 54 (including the operation buttons 54A to 54L), the marker section 55, the magnetic sensor 62, the acceleration sensor 63, the gyroscope 64. The UI controller 65 is connected to the codec LSI 66 and the expansion connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a charging connector, and the terminal device 7 can be charged with power supplied from an external power source using the charger 76 or the cable. Note that the terminal device 7 can be charged by being placed in an unillustrated cradle having a charging function.

The touch panel controller 61 is a circuit connected to the touch panel 52 for controlling the touch panel 52. The touch panel controller 61 generates touch position data in a predetermined format based on signals from the touch panel 52, and outputs it to the UI controller 65. The touch position data represents, for example, the coordinates of a position on the input surface of the touch panel 52 at which an input has been made. The touch panel controller 61 reads a signal from the touch panel 52 and generates touch position data once per a predetermined period of time. Various control instructions for the touch panel 52 are outputted from the UI controller 65 to the touch panel controller 61.

The analog stick section 53 outputs, to the UI controller 65, stick data representing the direction and the amount of sliding (or tilting) of the stick portion operated with the user's finger. The operation button group 54 outputs, to the UI controller

65, operation button data representing the input status of each of the operation buttons 54A to 54L (regarding whether it has been pressed).

The magnetic sensor 62 detects an azimuthal direction by sensing the magnitude and the direction of a magnetic field. Azimuthal direction data representing the detected azimuthal direction is outputted to the UI controller 65. Control instructions for the magnetic sensor 62 are outputted from the UI controller 65 to the magnetic sensor 62. While there are sensors using, for example, an MI (magnetic impedance) element, a fluxgate sensor, a Hall element, a GMR (giant magnetoresistance) element, a TNR (tunnel magnetoresistance) element, or an AMR (anisotropic magnetoresistance) element, the magnetic sensor 62 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of linear acceleration along each direction of three axes (the x-, y- and z-axes shown in FIG. 8(*a*)). Specifically, the acceleration sensor 63 detects the magnitude of linear acceleration along each axis, where the longitudinal direction of the housing 50 is taken as the x-axis, the width direction of the housing 50 as the y-axis, and a direction perpendicular to the front surface of the housing 50 as the z-axis. Acceleration data representing the detected acceleration is outputted to the UI controller 65. Also, control instructions for the acceleration sensor 63 are outputted from the UI controller 65 to the acceleration sensor 63. In the present example embodiment, the acceleration sensor 63 is assumed to be, for example, a capacitive MEMS acceleration sensor, but in another example embodiment, an acceleration sensor of another type may be employed. The acceleration sensor 63 may be an acceleration sensor for detection in one axial direction or two axial directions.

The gyroscope 64 is provided inside the housing 50 for detecting angular rates about the three axes, i.e., the x-, y-, and z-axes. Angular rate data representing the detected angular rates is outputted to the UI controller 65. Also, control instructions for the gyroscope 64 are outputted from the UI controller 65 to the gyroscope 64. Note that any number and combination of gyroscopes may be used for detecting angular rates about the three axes, and similar to the gyroscope 48, the gyroscope 64 may include a two-axis gyroscope and a one-axis gyroscope. Alternatively, the gyroscope 64 may be a gyroscope for detection in one axial direction or two axial directions.

The UI controller 65 outputs operation data to the codec LSI 66, including touch position data, stick data, operation button data, azimuthal direction data, acceleration data, and angular rate data received from various components described above. If another device is connected to the terminal device 7 via the expansion connector 58, data representing an operation performed on that device may be further included in the operation data.

The codec LSI 66 is a circuit for performing a compression process on data to be transmitted to the game apparatus 3, and a decompression process on data transmitted from the game apparatus 3. The LCD 51, the camera 56, the sound IC 68, the wireless module 70, the flash memory 73, and the infrared communication module 72 are connected to the codec LSI 66. The codec LSI 66 includes a CPU 77 and internal memory 78. While the terminal device 7 does not perform any game process itself, the terminal device 7 may execute a minimal set of programs for its own management and communication purposes. Upon power-on, the CPU 77 executes a program loaded into the internal memory 78 from the flash memory 73, thereby starting up the terminal device 7. Also, some area of the internal memory 78 is used as VRAM for the LCD 51.

The camera 56 picks up an image in response to an instruction from the game apparatus 3, and outputs data for the pick-up image to the codec LSI 66. Also, control instructions for the camera 56, such as an image pickup instruction, are outputted from the codec LSI 66 to the camera 56. Note that the camera 56 can also record video. Specifically, the camera 56 can repeatedly pick up images and repeatedly output image data to the codec LSI 66.

The sound IC 68 is a circuit connected to the speakers 67 and the microphone 69 for controlling input/output of sound data to/from the speakers 67 and the microphone 69. Specifically, when sound data is received from the codec LSI 66, the sound IC 68 outputs to the speakers 67 a sound signal obtained by performing D/A conversion on the sound data so that sound is outputted from the speakers 67. The microphone 69 senses sound propagated to the terminal device 7 (e.g., the user's voice), and outputs a sound signal representing the sound to the sound IC 68. The sound IC 68 performs A/D conversion on the sound signal from the microphone 69 to output sound data in a predetermined format to the codec LSI 66.

The codec LSI 66 transmits image data from the camera 56, sound data from the microphone 69, and terminal operation data from the UI controller 65 to the game apparatus 3 via the wireless module 70. In the present example embodiment, the codec LSI 66 subjects the image data and the sound data to a compression process as the codec LSI 27 does. The terminal operation data, along with the compressed image data and sound data, is outputted to the wireless module 70 as transmission data. The antenna 71 is connected to the wireless module 70, and the wireless module 70 transmits the transmission data to the game apparatus 3 via the antenna 71. The wireless module 70 has a similar function to that of the terminal communication module 28 of the game apparatus 3. Specifically, the wireless module 70 has a function of connecting to a wireless LAN by a scheme in conformity with the IEEE 802.11n standard, for example. Data to be transmitted may or may not be encrypted depending on the situation.

As described above, the transmission data to be transmitted from the terminal device 7 to the game apparatus 3 includes operation data (terminal operation data), image data, and sound data. In the case where another device is connected to the terminal device 7 via the expansion connector 58, data received from that device may be further included in the transmission data. In addition, the infrared communication module 72 performs infrared communication with another device in accordance with, for example, the IRDA standard. Where appropriate, data received via infrared communication may be included in the transmission data to be transmitted to the game apparatus 3 by the codec LSI 66.

As described above, compressed image data and sound data are transmitted from the game apparatus 3 to the terminal device 7. These data items are received by the codec LSI 66 via the antenna 71 and the wireless module 70. The codec LSI 66 decompresses the received image data and sound data. The decompressed image data is outputted to the LCD 51, and images are displayed on the LCD 51. The decompressed sound data is outputted to the sound IC 68, and the sound IC 68 outputs sound from the speakers 67.

Also, in the case where control data is included in the data received from the game apparatus 3, the codec LSI 66 and the UI controller 65 give control instructions to various sections in accordance with the control data. As described above, the control data is data representing control instructions for the components of the terminal device 7 (in the present example embodiment, the camera 56, the touch panel controller 61, the marker section 55, sensors 62 to 64, and the infrared communication module 72). In the present example embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 7 to the game apparatus 3. Note that the marker section 55 is configured by infrared LEDs, and therefore is simply controlled for power supply to be ON/OFF.

While the terminal device 7 includes operating means such as the touch panel 52, the analog sticks 53 and the operation button group 54, as described above, in another example embodiment, other operating means may be included in place of or in addition to these operating means.

Also, while the terminal device 7 includes the magnetic sensor 62, the acceleration sensor 63 and the gyroscope 64 as sensors for calculating the movement of the terminal device 7 (including its position and attitude or changes in its position and attitude), in another example embodiment, only one or two of the sensors may be included. Furthermore, in another example embodiment, any other sensor may be included in place of or in addition to these sensors.

Also, while the terminal device 7 includes the camera 56 and the microphone 69, in another example embodiment, the terminal device 7 may or may not include the camera 56 and the microphone 69 or it may include only one of them.

Also, while the terminal device 7 includes the marker section 55 as a feature for calculating the positional relationship between the terminal device 7 and the controller 5 (e.g., the position and/or the attitude of the terminal device 7 as seen from the controller 5), in another example embodiment, it may not include the marker section 55. Furthermore, in another example embodiment, the terminal device 7 may include another means as the aforementioned feature for calculating the positional relationship. For example, in another example embodiment, the controller 5 may include a marker section, and the terminal device 7 may include an image pickup element. Moreover, in such a case, the marker device 6 may include an image pickup element in place of an infrared LED.

[5. Outline of the Process in the Game System]

Next, the game process to be executed in the game system 1 of the present example embodiment will be outlined. In the game system 1, a game image is displayed on each of the display devices, i.e., the television 2 and the terminal device 7, which makes it possible to provide more readily recognizable game images to the player and render the game more user-friendly and enjoyable. Here, of the two display devices, the television 2 might have display delays due to various types of video processing to be performed for the purpose of, for example, enhancement of the quality of images. The game system 1 might have various problems caused by the display delays. The game system 1 prevents such various problems by measuring the time of display delay and performing a process in accordance with the delayed time.

(Display Delay of the Television 2)

Figure 11:
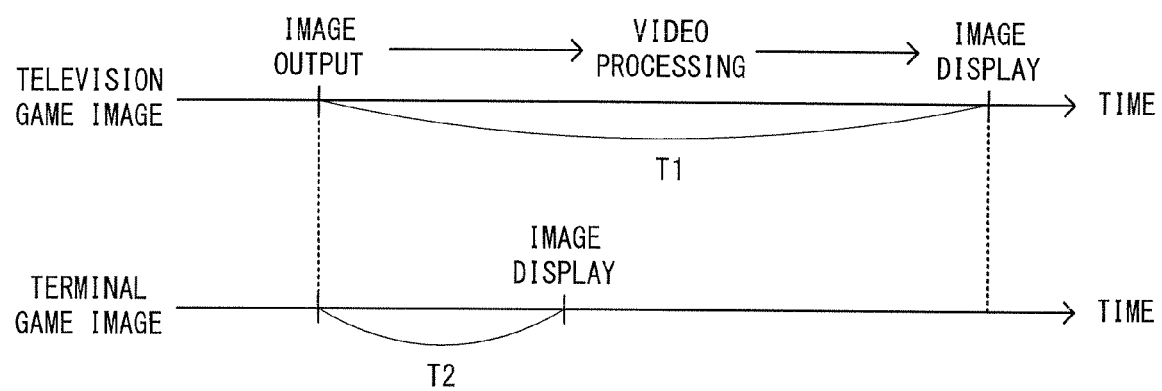
FIG. 11 is a diagram illustrating the time between output and display of game images in the example non-limiting game system.

FIG. 11 is a diagram illustrating the time between output and display of game images in the game system 1. Note that FIG. 11 assumes a virtual case (different from the actual operation in the example embodiment) where a television game image to be displayed on the television 2 and a terminal game image to be displayed on the terminal device 7 are outputted almost at the same time.

In FIG. 11, the television game image inputted to the television 2 is displayed on the screen after being subjected to predetermined video processing. In the present example embodiment, time T1 between the game apparatus 3 outputting the television game image and the television 2 displaying the television game image is referred to as an "image delay time (of the television 2)".

On the other hand, the terminal game image is subjected to a compression process upon an output instruction by the game apparatus 3 and then wirelessly transmitted to the terminal device 7, and the terminal device 7 performs a decompression process on the compressed terminal game image, so that the decompressed terminal game image is displayed on the LCD 51. Note that in the present example embodiment, the terminal device 7 does not perform video processing as described above. Accordingly, time T2 between an instruction to output the terminal game image and the terminal device 7 displaying the terminal game image is shorter than the image delay time T1 of the television 2. Moreover, in the present example embodiment, a highly efficient compression process or suchlike can make time T2 so short as to be considered insignificant when the time of one frame which is 1/60 of a second is considered as a unit of processing.

As described above, in the game system 1, time (image delay time) T1 before the television game image is displayed differs from time T2 before the terminal game image is displayed. Accordingly, when the television game image and the terminal game image are outputted at the same time, as shown in FIG. 11, the game images are displayed at different times. The game images being displayed at different times might result in, for example, the following problem. Specifically, when the player plays the game while viewing both the screen of the television 2 and the screen of the terminal device 7, if the game images are displayed at different times, the player might feel the displays to be unnatural or might be confused about which game image to view to perform a game operation, which might cause some trouble in the game operation. In addition, when a plurality (e.g., two) of players play the game with one player viewing the television 2 and the other viewing the terminal device 7, the game images being displayed at different times might result in advantage/disadvantage to either of the players or might cause some trouble to the players cooperatively playing the game. Note that the problem as mentioned above is more conspicuous in, for example, games that require strict timing of operations, such as a game to play music by performing a game operation at an appropriate time.

Therefore, in the present example embodiment, the game system 1 measures the image delay time by a method to be described later. Thereafter, the timing of outputting the terminal game image is delayed in accordance with the image delay time, such that the television game image and the terminal game image are displayed at the same time. Hereinafter, the method for measuring the image delay time will be described along with the process for delaying the timing of outputting the terminal game image.

(Measurement of the Delay Time)

Figure 12:
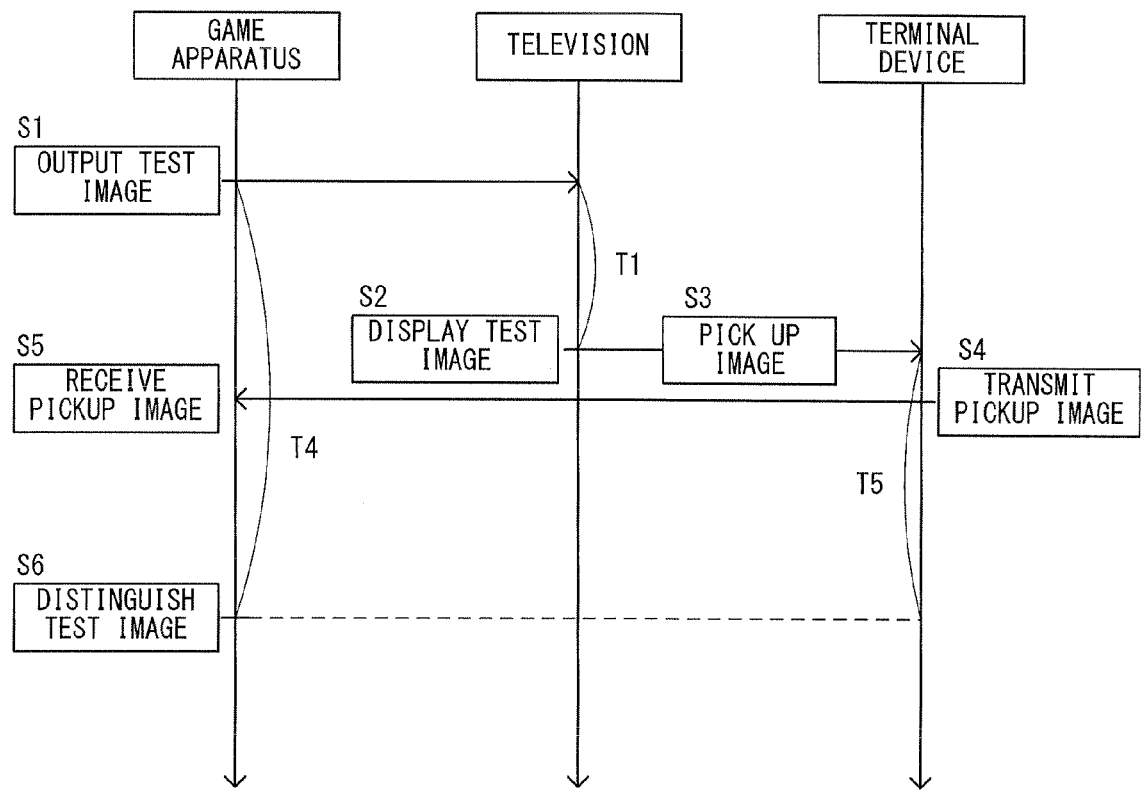
FIG. 12 is a timing chart illustrating a flow of the process for measuring an image delay time in the example non-limiting game system.

FIG. 12 is a timing chart illustrating a flow of the process for measuring an image delay time in the game system 1. When measuring the image delay time, the game apparatus 3 initially outputs a test image to the television 2 (step S1). The test image is a still (or dynamic) image of a predetermined pattern for use in image delay time measurement. As will be described in detail later, the test image is picked up by the camera 56 of the terminal device 7 when it is being displayed on the television 2. Any image can be employed as the test image so long as it can be recognized within an image picked up by the camera 56, by a recognition process to be described later.

Upon receipt of the test image, the television 2 displays the test image after performing video processing on the test image (step S2). Time T1 from the process of step S1 to the process of step S2 is the image delay time. Note that the video processing in the television 2 varies, for example, depending on the model of the television, and depending on the video mode being selected (i.e., the type of the video processing).

The terminal device 7 picks up the test image being displayed on the television 2 by the camera 56 (step S3). Accordingly, when measuring the image delay time, the terminal device 7 has an attitude with the camera 56 directed toward the screen of the television 2. As a result, the image (pickup image) picked up by the camera 56 includes the test image. The terminal device 7 wirelessly transmits the pickup image to the game apparatus 3 (step S4). Note that in the present example embodiment, the pickup image is compressed before transmission.

The compressed pickup image is received by the game apparatus 3 (step S5). At this time, the game apparatus 3 performs a decompression process on the compressed pickup image. Moreover, the game apparatus 3 performs a predetermined image recognition process on the pickup image (step S6). The image recognition process is a process for distinguishing the test image within the pickup image, thereby determining whether or not the test image is included in the pickup image, i.e., whether or not the test image is displayed on the screen of the television 2. Note that, in actuality, the processes of steps S3 to S6 are performed sequentially. Specifically, the terminal device 7 repeats the processes of picking up a screen image of the television 2 and transmitting the pickup image, and the game apparatus 3 repeats the processes of receiving a pickup image and performing the image recognition process on the pickup image.

In the image recognition process, when the test image is distinguished, the game apparatus 3 counts time T4 between the test image being outputted to the television 2 (step S1) and the image recognition process being completed (step S6). Note that the time of "completion of the image recognition process" is the time at which the pickup image is determined to include the test image.

Here, time T5 from the camera 56 of the terminal device 7 picking up the image (step S3) to completion of the image recognition process can be estimated and is approximately constant. The game apparatus 3 stores time T5 obtained by measurement beforehand. As a result, the game apparatus 3 can calculate image delay time T1 as a difference obtained by deducting time T5 from time T4.

As described above, in the present example embodiment, when the pickup image is determined to include the test image in the image recognition process (step S6), image delay time T1 is calculated based on the time of the determination (step S6), the time of the game apparatus 3 outputting the test image (step S1), and the time (time T5) taken after the image being picked up by the camera 56 before the determination. In the present example embodiment, the player simply directs the camera 56 of the terminal device 7 toward the screen of the television 2, which makes it possible to readily calculate the image delay time. In addition, the image delay time measurement can be performed at any arbitrary time, and therefore the player can perform the measurement, for example, at the initial installment of the game system 1 and also at the time when the video mode of the television 2 is changed. Thus, it is always possible to accurately measure the image delay time even when the image delay time is changed due to, for example, a change of the video mode.

In the present example embodiment, the game system 1 measures the image delay time beforehand by the method as described above, so that when a game process is performed, the timing of transmitting the terminal game image is delayed in accordance with the measured image delay time. Hereinafter, referring to FIG. 13, the process for delaying the timing of transmitting the terminal game image will be described.

(Adjustment of the Transmission Timing)

Figure 13:
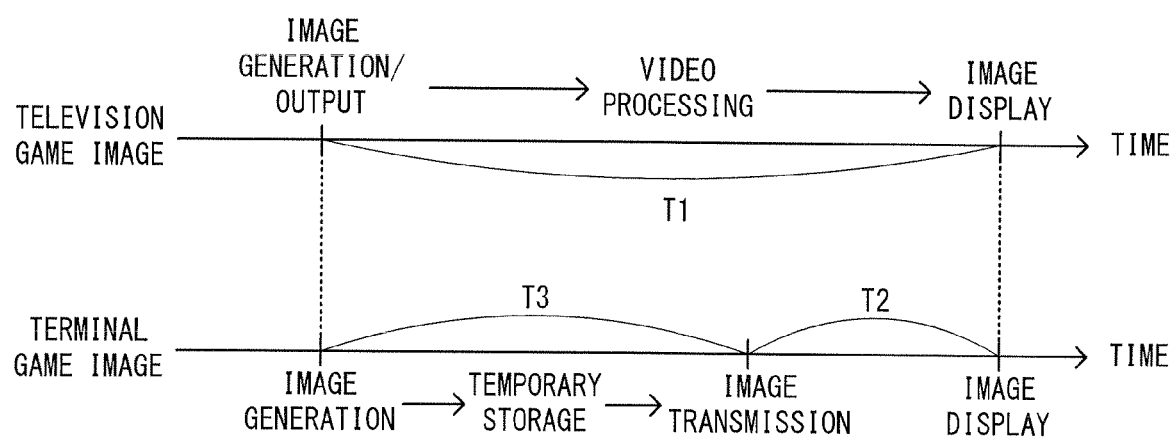
FIG. 13 is a diagram illustrating a flow of the process of transmitting a terminal game image in the example non-limiting game system.

FIG. 13 is a diagram illustrating a flow of the process of transmitting the terminal game image in the game system 1. As shown in FIG. 13, the game apparatus 3 generates the game images (the television game image and the terminal game image) almost at the same time. The game apparatus 3 outputs the television game image to the television 2 immediately after generating the image. On the other hand, the game apparatus 3 generates and temporarily stores the terminal game image therein, and stands by for transmission of the image to the terminal device 7. Here, time (standby time) T3 for which the game apparatus 3 stands by for transmission of the television game image is determined in accordance with the image delay time. Concretely, as shown in FIG. 13, standby time T3 is a period of time obtained by subtracting time T2 until the display of the terminal game image on the terminal device 7 from image delay time T1. Note that in the present example embodiment, time T2 may be considered to be merely so short as to be considered insignificant, and standby time T3 may be set to the same length as image delay time T1.

Once standby time T3 elapses after generation of the terminal game image, the game apparatus 3 transmits the terminal game image to the terminal device 7. Specifically, the terminal game image is compressed and transmitted to the terminal device 7, and the terminal device 7 decompresses the compressed terminal game image and displays the image on the LCD 51. Thus, it is possible to synchronize the timing of displaying the television game image and the terminal game image.

In this manner, in the present example embodiment, the game apparatus 3 delays the timing of transmitting the terminal game image to the terminal device 7 on the basis of the image delay time. Thus, the game apparatus 3 can transmit the terminal game image at an appropriate time according to the image delay time, and can ensure synchronization between the timing of displaying the television game image and the timing of displaying the terminal game image.

(Game Sound-Related Process)

As in the case of displaying the game images, there might be a delay in outputting a sound (sound output delay), i.e., a game sound (television game sound) to be outputted to the speakers 2*a* of the television 2. For example, when synchronizing an image to be displayed on the television 2 with a sound to be outputted from the speakers 2*a*, there is a sound output delay to be accompanied with an image display delay. In such a case where there is a delay in a television game sound so that there is a deviation between the timing of outputting a game sound (terminal game sound) from the terminal device 7 and the timing of outputting the television game sound, the player might feel the sound to be unnatural or there might be some trouble in the game operation.

Accordingly, in the present example embodiment, the game apparatus 3 measures a delay time for game sounds, and performs a process in accordance with the delay time, as in the case of the game images. Specifically, a delay time (sound delay time) for television game sounds is measured, and the timing of outputting the terminal game sounds is delayed in accordance with the sound delay time, thereby rendering the timing of outputting the television game sounds simultaneous with the timing of outputting the terminal game sounds.

As will be described in detail later, the sound delay time can be measured by a method in conformity with the method for measuring the image delay time. Specifically, when measuring the sound delay time, the game apparatus 3 initially outputs a test sound to the television 2, the test sound being a sound of a predetermined pattern for use in measuring the sound delay time. Upon receipt of the test sound, the television 2 outputs the test sound from the speakers 2a. The time between the game apparatus 3 outputting the test sound and the speakers 2a outputting the test sound is the sound delay time. The sound delay time varies, for example, depending on the model of the television, depending on the video mode being selected, and depending on whether or not the television 2 has the function of synchronously outputting images and sounds.

Furthermore, the terminal device 7 detects the test sound outputted by the speakers 2a at the microphone 69. In addition, the sound detected by the microphone 69 (detected sound) includes the test sound. The terminal device 7 compresses and wirelessly transmits the detected sound to the game apparatus 3. The game apparatus 3 receives and decompresses the compressed sound. Moreover, the game apparatus 3 performs a predetermined sound recognition process on the sound. The sound recognition process is a process for distinguishing the test sound from the detected sound, thereby determining whether or not the detected sound includes the test sound, i.e., whether or not the television 2 outputted the test sound from the speakers 2a. Note that the terminal device 7 repeats the processes of detecting a sound from the speakers 2a and transmitting the detected sound, and the game apparatus 3 repeats the processes of receiving a detected sound and performing the sound recognition process on the received sound.

In the sound recognition process, when the test sound is successfully distinguished, the game apparatus 3 counts time (counted time) between the test sound being outputted to the television 2 and completion of the sound recognition process. Note that the time of "completion of the sound recognition process" is the time at which the detected sound is determined to include the test sound. In addition, the processing time between the microphone 69 of the terminal device 7 detecting a sound and the sound recognition process being completed is previously measured and stored. Accordingly, the game apparatus 3 can calculate the sound delay time as a difference obtained by deducting the processing time from the counted time.

Furthermore, as in the case of the game images, the game apparatus 3 delays the terminal game sound by a sound standby time corresponding to the sound delay time and outputs the sound to the terminal device 7. Thus, it is possible to synchronize the timing of outputting the television game sound with the timing of outputting the terminal game sound.

[6. Details of the Processes in the Game System]

Figure 14:
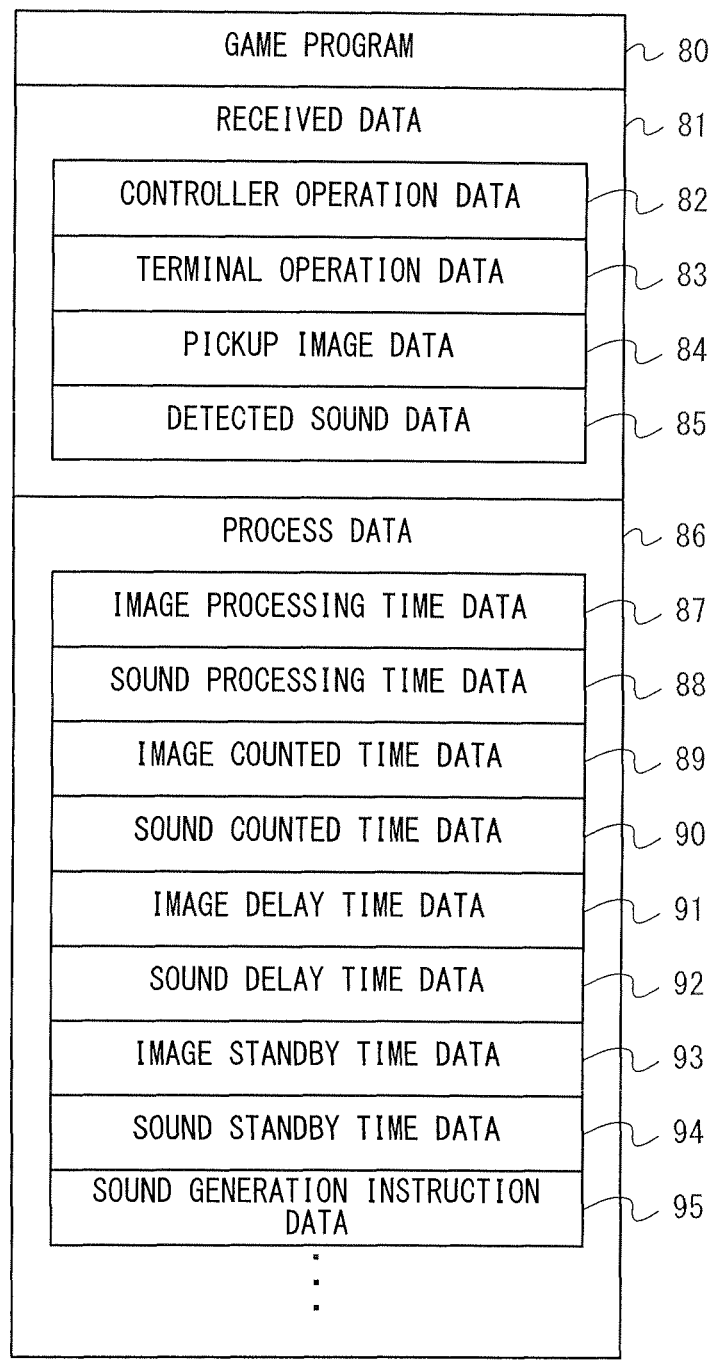
FIG. 14 is a diagram illustrating various types of data for use in processes in the example non-limiting game system.

Next, detailed processes to be executed in the present game system will be described. First, various types of data for use in the processes in the game system 1 will be described. FIG. 14 is a diagram illustrating the data for use in the processes in the game system 1. In FIG. 14, main data stored in the main memory (the external main memory 12 or the internal main memory 11e) of the game apparatus 3 is shown. As shown in FIG. 14, the main memory of the game apparatus 3 has stored therein a game program 80, received data 81, and process data 86. Note that in addition to the data shown in FIG. 14, the main memory has stored therein data to be used in the game such as image data for various objects appearing in the game and sound data.

The game program 80 is partially or entirely read from the optical disc 4 at an appropriate time after the power-on of the game apparatus 3, and then stored to the main memory. Note that the game program 80 may be acquired from the flash memory 17 or a device external to the game apparatus 3 (e.g., via the Internet), rather than from the optical disc 4. Also, a portion of the game program 80 (e.g., a program for calculating the attitude of the controller 5 and/or the attitude of the terminal device 7) may be prestored in the game apparatus 3. The game program 80 includes programs for performing an image delay measurement process (FIG. 15), a sound delay measurement process (FIG. 16), and a game process (FIG. 17) to be described later.

The received data 81 includes various types of data received from the controller 5 and the terminal device 7. Specifically, the received data 81 includes controller operation data 82, terminal operation data 83, pickup image data 84, and detected sound data 85. In the case where a plurality of controllers 5 are connected, the controller operation data 82 is stored in a plurality of sets. In the case where a plurality of terminal devices 7 are connected, each of the terminal operation data 83, the pickup image data 84, and the detected sound data 85 is stored in a plurality of sets.

The controller operation data 82 is data representing the user's (player's) operation on the controller 5. The controller operation data 82 is transmitted by the controller 5, acquired by the game apparatus 3, and then stored to the main memory. The controller operation data 82 includes data representing the results of detections by the acceleration sensor 37 and the gyroscope 48, data representing input states of the operation buttons 32a to 32i, and data representing marker coordinates, as described above. The main memory may have stored therein the controller operation data up to a predetermined number of pieces counted from the latest piece (the last acquired piece).

Note that the controller operation data 82 may include only part of the data items mentioned above so long as the operation by the user using the controller 5 can be represented. Also, when the controller 5 includes other input means (e.g., a touch panel, an analog stick, etc.), the controller operation data 82 may include data representing operations on those other input means.

The terminal operation data 83 is data representing the user's operation on the terminal device 7. The terminal operation data 83 is transmitted by the terminal device 7, acquired by the game apparatus 3, and then stored to the main memory. The terminal operation data 83 includes touch position data, stick data, operation button data, azimuthal direction data, acceleration data, and angular rate data, as described above. Note that the main memory may have stored therein the terminal operation data up to a predetermined number of pieces counted from the latest piece (the last acquired piece).

Note that the terminal operation data 83 may include only part of the data items mentioned above so long as the operation by the user using the terminal device 7 can be represented. Also, when the terminal device 7 includes other input means (e.g., a touch pad, an imaging information calculation section such as that denoted at 35 for the controller 5, etc.), the terminal operation data 83 may include data representing operations on those other input means.

The pickup image data 84 is data representing an image (camera image) picked up by the camera 56 of the terminal device 7. The pickup image data 84 is an image data obtained by the codec LSI 27 decompressing compressed image data from the terminal device 7, and the input/output processor 11*a* stores the data to the main memory. Note that the main memory may have stored therein the pickup image data up to a predetermined number of pieces counted from the latest piece (the last acquired piece).

The detected sound data 85 is data representing a sound (detected sound) detected by the microphone 69 of the terminal device 7. The detected sound data 85 is sound data obtained by the codec LSI 27 decompressing compressed sound data transmitted by the terminal device 7, and the input/output processor 11*a* stores the data to the main memory.

The process data 86 is data to be used in the information processing (FIGS. 15 to 17) in the game system 1. The process data 86 includes image processing time data 87, sound processing time data 88, image counted time data 89, sound counted time data 90, image delay time data 91, sound delay time data 92, image standby time data 93, sound standby time data 94, and sound generation instruction data 95. Note that in addition to the data shown in FIG. 14, the process data 86 includes various types of data to be used in the game process, e.g., data representing various parameters being set for various objects appearing in the game.

The image processing time data 87 is data indicating a processing time to be taken for measuring the image delay time, which will be referred to below as an "image processing time", and specifically, the image processing time spans from pick up of an image to recognition of a test image within the pickup image. More concretely, the image processing time is time T5 between the camera 56 of the terminal device 7 picking up an image and the image recognition process being completed (see FIG. 12). The image processing time is measured beforehand, and data indicating the measured time is prestored to the optical disc 4, along with the game program 80. In the case where the game apparatus 3 performs the image delay measurement process, the data is read from the optical disc 4 at an appropriate time and then stored to the main memory as image processing time data 87.

The sound processing time data 88 is data indicating a processing time to be taken for measuring the sound delay time, which will be referred to below as a "sound processing time", and specifically, the sound processing time spans from detection of a sound from the speakers 2*a* to recognition of a test sound to be described later. More concretely, the sound processing time is a period of time between the microphone 69 of the terminal device 7 detecting the sound and the sound recognition process being completed. The sound processing time is measured beforehand, and data indicating the measured time is prestored to the optical disc 4, along with the game program 80. In the case where the game apparatus 3 performs the sound delay measurement process, the data is read from the optical disc 4 at an appropriate time and then stored to the main memory as sound processing time data 88.

The image counted time data 89 is data indicating time to be taken for the image delay measurement process, i.e., time (image counted time) T4 between the game apparatus 3 outputting a test image to the television 2 and the image recognition process being completed. In addition, the sound counted time data 90 is data indicating time to be taken for the sound delay measurement process, i.e., time (sound counted time) between the game apparatus 3 outputting a test sound to the television 2 and the sound recognition process being completed.

The image delay time data 91 is data indicating the image delay time, i.e., time between the game apparatus 3 outputting a television game image and the television 2 displaying the television game image. In addition, the sound delay time data 92 is data indicating the sound delay time, i.e., time between the game apparatus 3 outputting a television game sound and the speakers 2*a* of the television 2 outputting the television game sound.

The image standby time data 93 is data indicating a standby time (image standby time) from generation to output of a terminal game image. The image standby time is set on the basis of the image delay time. In addition, the sound standby time data 94 is data indicating a standby time (sound standby time) from determination of a terminal game sound to be generated to actual generation and output of the sound.

The sound generation instruction data 95 is data indicating an instruction (sound generation instruction) by the CPU 10 to the DSP 11*c* to generate a sound. In the present example embodiment, to delay the timing of outputting the terminal game sound, the sound generation instruction is stored temporarily to the main memory. The temporarily stored sound generation instruction is sent to the DSP 11*c* at the time of the terminal game sound being actually outputted to the terminal device 7, and upon receipt of the sound generation instruction, the DSP 11*c* generates and transmits a terminal game sound to the terminal device 7.

Figure 15:
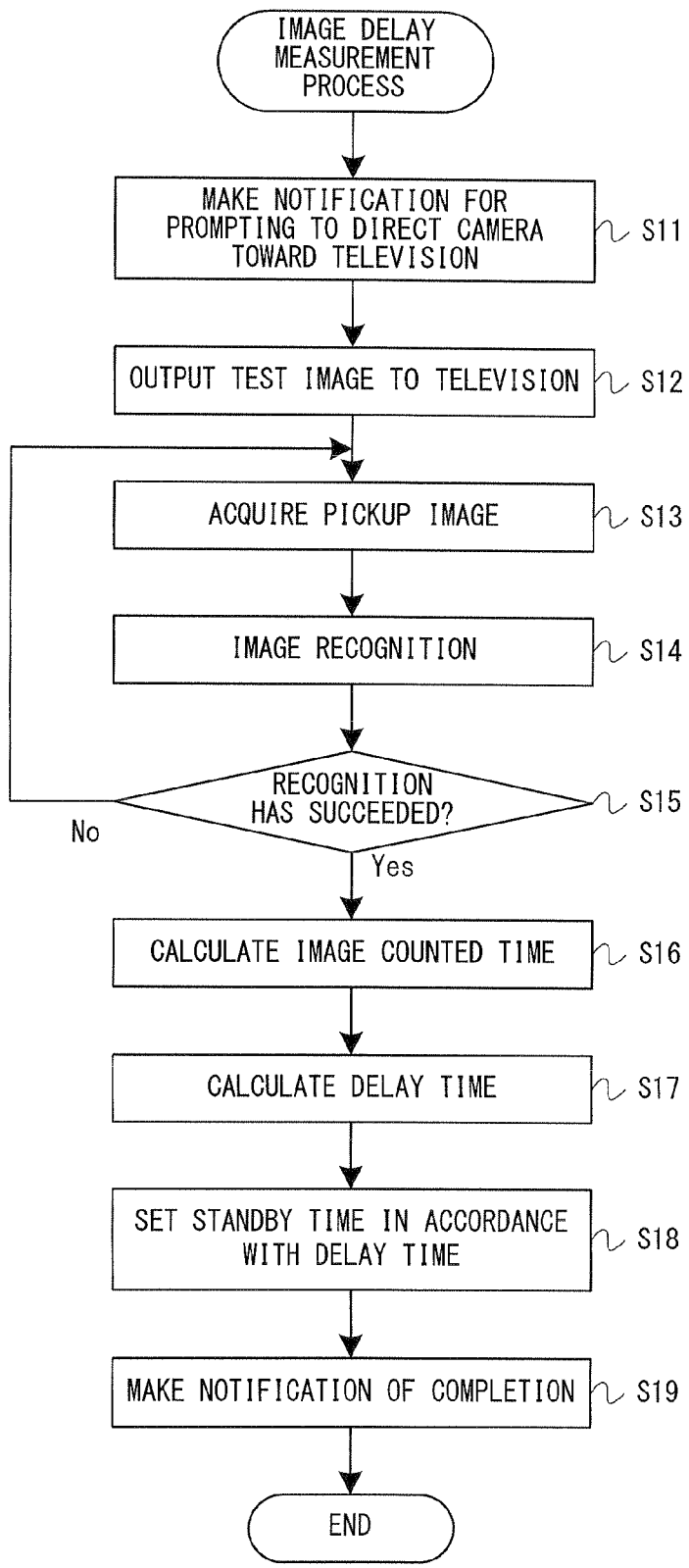
FIG. 15 is a flowchart illustrating a flow of an image delay measurement process to be performed in the example non-limiting game apparatus.

Next, referring to FIGS. 15 to 17, the processes to be performed in the game apparatus 3 will be described in detail. FIG. 15 is a flowchart illustrating a flow of the image delay measurement process to be performed in the game apparatus 3. The image delay measurement process is a process of measuring an image delay time and setting an image standby time in accordance with the image delay time. The image delay measurement process may be performed at any arbitrary time, e.g., at the initial installment of the game system 1 or at the start of performing the game program 80.

Figure 16:
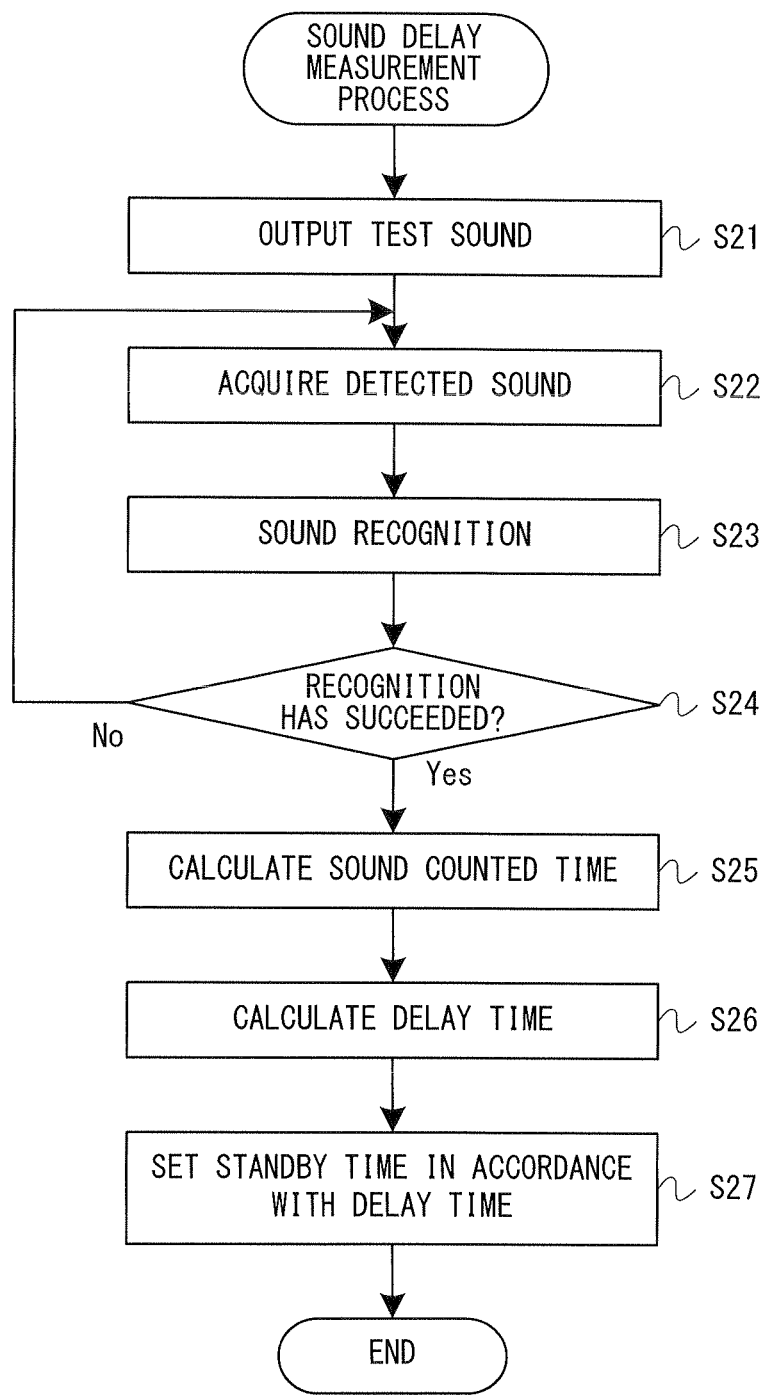
FIG. 16 is a flowchart illustrating a flow of a sound delay measurement process to be performed in the example non-limiting game apparatus.
Figure 17:
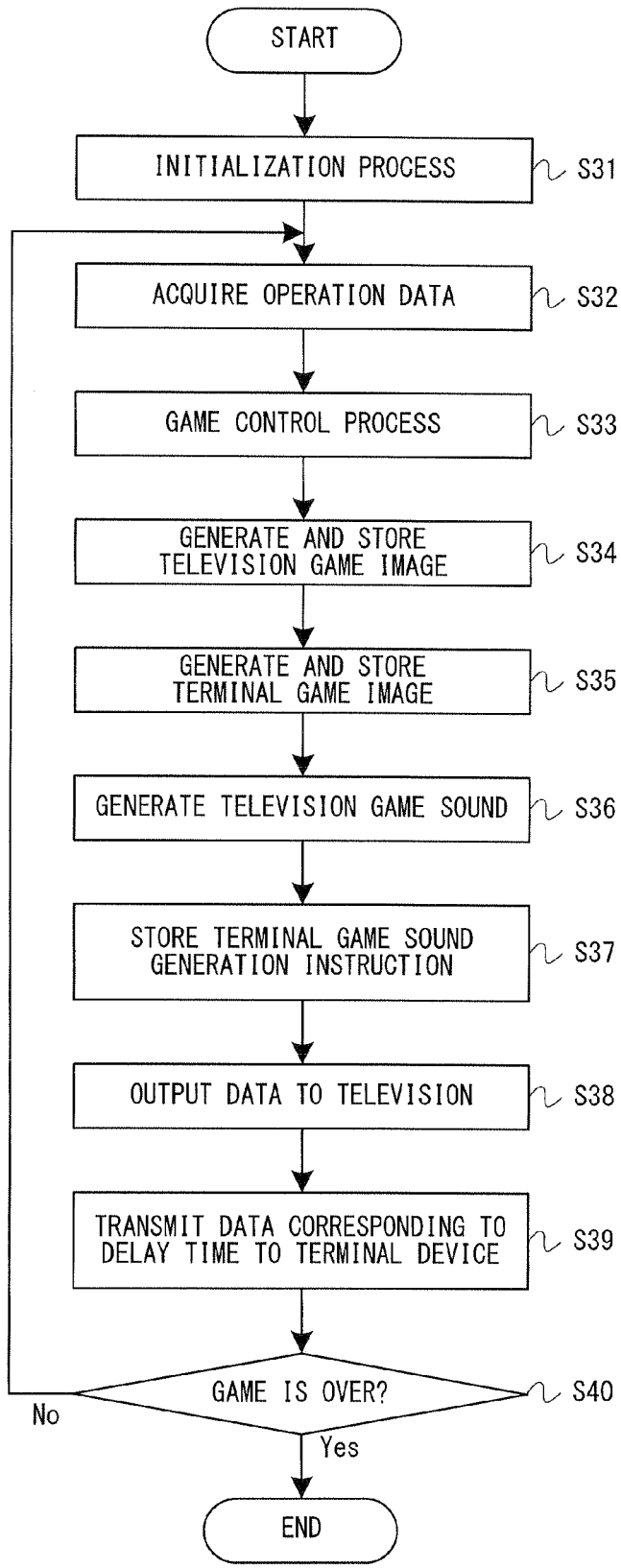
FIG. 17 is a flowchart illustrating a flow of a game process to be performed in the example non-limiting game apparatus.

Note that processing in each step of the flowcharts shown in FIGS. 15 to 17 is merely illustrative, and if similar results can be achieved, the processing order of the steps may be changed. In addition, values of variables and thresholds to be used in determination steps are also merely illustrative, and other values may be used appropriately. Furthermore, while the present example embodiment is described on the premise that the CPU 10 performs processing in each step of the flowcharts, part of the steps in the flowcharts may be performed by a processor other than the CPU 10 or by specialized circuits.

In FIG. 15, the CPU 10 initially in step S11 causes an image to be displayed to provide an instruction to direct the camera 56 of the terminal device 7 toward the television 2. This image may be displayed either on the television 2 or the terminal device 7, or both. Concretely, an image indicating, for example, the message "Direct the camera of the terminal device toward the television" is generated by a collaboration of the CPU 10 and GPU lib, and then stored to the VRAM 11*d*. In the case where the image is outputted to the television 2, the CPU 10 sends data for the image stored in the VRAM 11*d* to the AV-IC 15, and the AV-IC 15 outputs the image data to the television 2 via the AV connector 16. As a result, the image is displayed on the television 2. Moreover, in the case where the image is outputted to the terminal device 7, the CPU 10 sends the image data stored in the VRAM 11*d* to the codec LSI 27, and the codec LSI 27 performs a predetermined compression process on that data. In addition, the terminal communication module 28 transmits the image data subjected to the compression process to the terminal device 7 via the antenna 29. The terminal device 7 receives the image data transmitted by the game apparatus 3 at the wireless module 70, and the codec LSI 66 performs a predetermined decompression process on the received data. The image data subjected to the decompression process is outputted to the LCD 51, and the image is displayed on the LCD 51. Following step S11, the process of step S12 is performed.

In step S12, the CPU 10 starts outputting a test image to the television 2. Specifically, a predetermined test image is generated by a collaboration of the CPU 10 and the GPU 11b, and then outputted to the television 2. The operation of step S12 for outputting the image to the television 2 is the same as the operation of step S11. In addition, the CPU 10 starts counting time from the point of processing in step S12. Note that after the process of step S12, the test image is repeatedly outputted once per frame time (here, 1/60 seconds) until the end of the image delay measurement process. The test image may be a still or dynamic image, or a still image may be repeatedly displayed once per given time as will be described later. Following the process of step S12, the process of step S13 is performed.

In step S13, the CPU 10 acquires a pickup image from the terminal device 7. Here, the terminal device 7 repeatedly transmits terminal operation data, pickup image data, and detected sound data to the game apparatus 3. The game apparatus 3 sequentially receives these data items. Specifically, in the game apparatus 3, the terminal communication module 28 sequentially receives the data items, and the codec LSI 27 sequentially performs a decompression process on the pickup image data and the detected sound data. Thereafter, the input/output processor 11a sequentially stores the terminal operation data, the pickup image data, and the detected sound data to the main memory. In step S13, the CPU 10 reads pickup image data 84 included in the latest terminal operation data from the main memory. Following step S13, the process of step S14 is performed.

In step S14, the CPU 10 performs an image recognition process on the pickup image acquired in step S13. Concretely, the CPU 10 performs a process for distinguishing the test image within the pickup image. Note that the concrete method for distinguishing the test image may be determined arbitrarily, and for example, the test image can be distinguished within the pickup image by a pattern matching technique. Following step S14, the process of step S15 is performed.

In step S15, the CPU 10 determines whether or not the image recognition process of step S14 has succeeded, i.e., whether or not the image recognition process has distinguished the test image. The determination process of step S15 is a process for determining whether or not the pickup image acquired in step S13 includes the test image, that is, a process for determining whether or not the test image is displayed on the screen of the television 2. When the result of the determination in step S15 is affirmative, the process of step S16 is performed. On the other hand, when the result of the determination in step S15 is negative, the process of step S13 is performed again. In this manner, a series of processes in steps S13 to S15 are repeatedly performed until the image recognition process succeeds. Note that the process loop of steps S13 to S15 may be performed once per frame time, or the process loop may be performed at intervals each being longer than one frame time depending on the time to be taken for the image recognition process.

In step S16, the CPU 10 calculates image counted time between the game apparatus 3 outputting the test image to the television 2 and the image recognition process being completed. Concretely, the CPU 10 counts time elapsed between the process of step S12 and the process of step S16, and stores data indicating the counted time to the main memory as image counted time data 89. Following step S16, the process of step S17 is performed.

In step S17, the CPU 10 calculates an image delay time. Concretely, the CPU 10 reads the image processing time data 87 and the image counted time data 89 from the main memory, and calculates the image delay time as a difference obtained by deducting the image processing time from the image counted time. Thereafter, data indicating the calculated image delay time is stored to the main memory as image delay time data 91. Following step S17, the process of step S18 is performed.

In step S18, the CPU 10 sets an image standby time on the basis of the image delay time. Here, the image standby time is calculated by subtracting time between the game apparatus 3 outputting the terminal game image and the television 2 displaying the image from the image delay time (see FIG. 13). In the present example embodiment, the time up to the terminal device 7 displaying the terminal game image is considered insignificant, and the image standby time is set to be equal to the image delay time. The CPU 10 stores data indicating the set image standby time to the main memory as image standby time data 93. Note that in the case where the set image standby time is used continually, the image standby time data 93 may be stored to the flash memory 17. Following step S18, the process of step S19 is performed.

In step S19, the CPU 10 notifies the player that measurement of the image delay time (setting of the image standby time) has been completed. Concretely, an image indicating, for example, the message "Setting completed. Start game". This image may be displayed either on the television 2 or the terminal device 7, or both. Note that the operation of step S19 for outputting the image to the television 2 or the terminal device 7 is the same as the operation of step S11. After the process of step S19, the CPU 10 ends the image delay measurement process.

By the image delay measurement process, the game apparatus 3 can measure an image delay time and set the image standby time in accordance with the image delay time. Note that in the present example embodiment, to measure an image delay time, the player is prompted to direct the camera 56 of the terminal device 7 toward the television 2. Here, if the camera 56 is directed toward the television 2 after the test image is displayed, the counted time cannot be accurately obtained, making it impossible to measure an accurate image delay time.

Therefore, in the present example embodiment, the CPU 10 generates an image making a notification for prompting to direct the camera 56 toward the screen of the television 2, and after the image is displayed (step S11), the CPU 10 causes the television 2 to display the test image (step S12). As a result, it is rendered possible that the camera 56 is directed toward the television 2 before the test image is displayed, resulting in an accurately calculated image delay time. Note that the process of step S12 may be performed after a lapse of a predetermined time period since the notification in step S11.

In another example embodiment, the CPU 10 may perform a process of determining whether or not the camera 56 is directed toward the screen of the television 2. In this case, when the CPU 10 determines the camera 56 to be directed toward the screen of the television 2, the CPU 10 causes the television 2 to display the test image. As a result, it is possible to ensure that the camera 56 is directed toward the television 2 before the test image is displayed. Note that a conceivable example of the determination method is to determine whether or not the player has performed a predetermined operation (e.g., an operation of pressing a predetermined button of the terminal device 7) after directing the camera 56 toward the television 2. Another conceivable example of the determination method is to determine whether or not the camera 56 has picked up a predetermined image displayed on the television 2. Note that the predetermined image may be the same as the test image. Specifically, the CPU 10 may cause the test image to be displayed repeatedly (intermittently) once per given time, and an image delay time may be measured and calculated not when the camera 56 picks up the first test image displayed but when the camera 56 picks up the next test image displayed. Alternatively, for example, the CPU 10 may calculate an image delay time using as a test image an image displayed after the camera 56 picks up a predetermined one of a plurality of images included in a series of dynamic images (e.g., a title screen of the game).

Furthermore, the CPU 10 may perform the process for calculating the image delay time a predetermined number of times. Concretely, the CPU 10 may perform a series of processes of steps S12 to S17 a predetermined number of times, thereby calculating a plurality of sets of image delay times. An average of the plurality of sets of image delay times may be calculated as a final image delay time. As a result, the image delay time can be calculated more accurately.

Next, the sound delay measurement process will be described. FIG. 16 is a flowchart illustrating a flow of the sound delay measurement process to be performed in the game apparatus 3. The sound delay measurement process is a process for measuring a sound delay time and setting a sound standby time in accordance with the sound delay time. As in the case of the image delay measurement process, the sound delay measurement process may be performed at any arbitrary time, e.g., it may be performed successively after the image delay measurement process. Moreover, in the sound delay measurement process, unlike in the image delay measurement process, the camera 56 of the terminal device 7 does not have to be directed toward the television 2, and therefore the CPU 10 can perform the sound delay measurement process, for example, while the game is being played (while a game operation is being performed). In addition, the CPU 10 can perform the sound delay measurement process simultaneously with (in parallel with) the image delay measurement process.

In FIG. 16, the CPU 10 initially in step S21 starts outputting a test sound to the speakers 2a of the television 2. Specifically, the DSP 11c generates and sends data for a predetermined test sound to the AV-IC 15 in accordance with an instruction from the CPU 10. In response to this, the AV-IC 15 outputs the test sound data to the television 2 via the AV connector 16. As a result, the test sound is outputted from the speakers 2a. In addition, the CPU 10 starts counting time from the point of processing in step S21. Following step S21, the process of step S22 is performed.

In step S22, the CPU 10 acquires a detected sound from the terminal device 7. Here, the terminal device 7 repeatedly transmits terminal operation data, pickup image data, and detected sound data to the game apparatus 3. The game apparatus 3 sequentially receives these data items. Specifically, in the game apparatus 3, the terminal communication module 28 sequentially receives the data items, and the codec LSI 27 sequentially performs a decompression process on the pickup image data and the detected sound data. Thereafter, the input/output processor 11a sequentially stores the terminal operation data, the pickup image data, and the detected sound data to the main memory. In step S22, the CPU 10 reads detected sound data 85 included in the latest terminal operation data from the main memory. Following step S22, the process of step S23 is performed.

In step S23, the CPU 10 performs a sound recognition process on the detected sound acquired in step S22. Concretely, the CPU 10 performs a process for distinguishing the test sound included in the detected sound. Note that the concrete method for distinguishing the test sound may be arbitrary, and the test sound included in the detected sound can be distinguished by, for example, comparing the detected sound and the test sound in terms of their waveforms and frequency spectra. Following step S23, the process of step S24 is performed.

In step S24, the CPU 10 determines whether or not the sound recognition process of step S23 has succeeded, i.e., whether or not the sound recognition process has distinguished the test sound. The determination process of step S24 is a process for determining whether or not the detected sound acquired in step S23 includes the test sound, that is, a process for determining whether or not the test sound has been outputted from the speakers 2a of the television 2. When the result of the determination in step S24 is affirmative, the process of step S25 is performed. On the other hand, when the result of the determination in step S24 is negative, the process of step S22 is performed again. In this manner, a series of processes in steps S22 to S24 are repeatedly performed until the sound recognition process succeeds. Note that the process loop of steps S22 to S24 may be performed once per frame time, or the process loop may be performed at intervals each being longer than one frame time depending on the time to be taken for the sound recognition process.

In step S25, the CPU 10 calculates a sound counted time between the game apparatus 3 outputting the test sound to the television 2 and the sound recognition process being completed. Concretely, the CPU 10 counts time elapsed between the process of step S21 and the process of step S25, and stores data indicating the counted time to the main memory as sound counted time data 90. Following step S25, the process of step S26 is performed.

In step S26, the CPU 10 calculates a sound delay time. Concretely, the CPU 10 reads the sound processing time data 88 and the sound counted time data 90 from the main memory, and calculates the sound delay time as a difference obtained by deducting the sound processing time from the sound counted time. Thereafter, data indicating the calculated sound delay time is stored to the main memory as sound delay time data 92. Following step S26, the process of step S27 is performed.

In step S27, the CPU 10 sets a sound standby time on the basis of the sound delay time. Here, the sound standby time is calculated by subtracting time between the game apparatus 3 generating the terminal game sound and the terminal device 7 outputting the sound from the sound delay time. In the present example embodiment, the time up to the terminal device 7 outputting the terminal game sound is considered insignificant, and the sound standby time is set to be equal to the sound delay time. The CPU 10 stores data indicating the set sound standby time to the main memory as sound standby time data 94. Note that in the case where the set sound standby time is used continually, the sound standby time data 94 may be stored to the flash memory 17. After step S27, the CPU 10 ends the sound delay measurement process.

By the sound delay measurement process, the game apparatus 3 can measure a sound delay time, and set a sound standby time in accordance with the sound delay time. Note that the sound delay measurement process does not require the player to perform a particular operation, and therefore the processes for providing a notification to the player (steps S11 and S19) are not performed. However, in another example embodiment, to more reliably detect the test sound, the CPU 10 may perform the notification processes with an intention to cause the player not to make any sound.

Furthermore, the CPU 10 may perform the process for calculating the sound delay time a predetermined number of times. Concretely, the CPU 10 may perform a series of processes of steps S21 to S26 a predetermined number of times, thereby calculating a plurality of sets of sound delay times. An average of the plurality of sets of sound delay times may be calculated as a final sound delay time. As a result, the sound delay time can be calculated more accurately.

Next, the game process to be performed in the game apparatus 3 will be described. FIG. 17 is a flowchart illustrating a flow of the game process to be performed in the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. Note that the game apparatus 3 may be configured such that the game program stored in the optical disc 4 is executed immediately after the power-on or such that an internal program for displaying a predetermined menu screen is initially executed after the power-on and then the game program stored in the optical disc 4 is executed when the user provides an instruction to start the game. The flowchart shown in FIG. 17 illustrates a process to be performed when the processes described above are completed.

First, in step S31, the CPU 10 performs an initialization process. The initialization process is, for example, a process of setting initial values of various parameters to be used in the game process. Moreover, in the case where the flash memory 17 has the standby time data 93 and 94 stored therein, the standby time data 93 and 94 may be loaded into the main memory. Following step S31, the process of step S32 is performed.

After step S31, a process loop including a series of processes of steps S32 to S40 is repeatedly performed once per a predetermined period of time (one frame time).

In step S32, the CPU 10 acquires operation data transmitted by each of the controller 5 and the terminal device 7. The controller 5 repeatedly transmits controller operation data to the game apparatus 3, the game apparatus 3 sequentially receives the controller operation data at the controller communication module 19, and the input/output processor 11*a* sequentially stores the received controller operation data to the main memory. Each interval between transmissions/receptions may be shorter than the time for game processing, and may be, for example, 1/200 seconds. In addition, as described above in conjunction with step S13, the terminal operation data, the camera image data, and the microphone sound data are sequentially stored to the main memory. In step S32, the CPU 10 reads the latest pieces of controller operation data 82 and terminal operation data 83 from the main memory. Following step S32, the process of step S33 is performed.

In step S33, the CPU 10 performs a game control process. The game control process is a process for causing the game to progress by performing, for example, a process of moving objects in the game space using the operation data as inputs. In the present example embodiment, the specific content of the game control process may be arbitrary. Following step S33, the process of step S34 is performed.

In step S34, the CPU 10 and the GPU 11*b* collaborate to generate a television game image to be displayed on the television 2. Specifically, the CPU 10 and the GPU 11*b* collaborate to read data representing the result of the game control process in step S33 from the main memory and data for use in game image generation from the VRAM 11*d*, and generate the game image. The game image may be generated by any method so long as the result of the game control process in step S33 is represented. For example, the game image generation method may be a method in which a three-dimensional CG image is generated by calculating a virtual game space as viewed from a virtual camera arranged in the game space or a method in which a two-dimensional image is generated (without using any virtual camera). The generated television game image is stored to the VRAM 11*d*. Following step S34, the process of step S35 is performed.

In step S35, the CPU 10 and the GPU 11*b* collaborate to generate a terminal game image to be displayed on the terminal device 7. As in the case of the television game image, the terminal game image may be generated by any method so long as the result of the game control process in step S33 is represented. Moreover, the terminal game image may or may not be generated by the same method as the television game image. The generated terminal game image is stored to the VRAM 11*d*. Note that the television game image and the terminal game image may be the same depending on the content of the game, and in such a case, the process of step S35 for game image generation is not performed.

Following step S35, the process of step S36 is performed. In step S36, a television game sound to be outputted to the speakers 2*a* of the television 2 is generated. Specifically, the CPU 10 causes the DSP 11*c* to generate a game sound in accordance with the result of the game control process in step S33. Note that the game sound to be generated may include, for example, a game sound effect, the voice of a character appearing in the game, and background music (BGM). Following step S36, the process of step S37 is performed.

In step S37, a sound generation instruction is generated which is intended to generate a terminal game sound to be outputted to the speakers 67 of the terminal device 7. The generated sound generation instruction is stored to the main memory as sound generation instruction data 95. Note that the terminal game sound may or may not be the same as the television game sound. Alternatively, the terminal game sound may be only partially different from the television game sound, for example, so as to include the same sound effect and different BGM. Following step S37, the process of step S38 is performed.

In step S38, the CPU 10 outputs the game image and the game sound to the television 2. Concretely, the CPU 10 sends data for the latest television game image stored in the VRAM 11*d* and data for the television game sound generated by the DSP 11*c* in step S36 to the AV-IC 15. In response to this, the AV-IC 15 outputs the image and sound data to the television 2 via the AV connector 16. As a result, after the television 2 performs predetermined video processing, the television game image is displayed on the television 2, and the television game sound is outputted from the speakers 2*a*. Following step S38, the process of step S39 is performed.

In step S39, the CPU 10 transmits the game image and the game sound to the terminal device 7 in accordance with their standby times. Concretely, the CPU 10 transmits to the terminal device 7 the terminal game image that has been stored in the VRAM 11*d* for the image standby time since its generation in step S35. In addition, the CPU 10 sends to the DSP 11*c* the sound generation instruction that has been stored for the sound standby time since step S37, thereby causing the DSP 11*c* to generate the terminal game sound. Note that it is possible to know the image standby time and the sound standby time with reference to the image standby time data 93 and the sound standby time data 94 stored in the main memory. The terminal game image data and the terminal game sound data are sent to the codec LSI 27, and subjected to a predetermined compression process by the codec LSI 27. In addition, the terminal communication module 28 transmits the image and sound data subjected to the compression process to the terminal device 7 via the antenna 29. The terminal device 7 receives the image and sound data transmitted from the game apparatus 3 at the wireless module 70, and the codec LSI 66 performs a predetermined decompression process on the received data. The decompressed image data is outputted to the LCD 51, and the decompressed sound data is outputted to the sound IC 68. As a result, the terminal game image is displayed on the LCD 51 with a delay of the image standby time, and the terminal game sound is outputted from the speakers 67 with a delay of the sound standby time. Thus, the timing of displaying the television game image and the terminal game image can be synchronized, and the timing of outputting the television game sound and the terminal game sound can be synchronized as well. Following step S39, the process of step S40 is performed.

In step S40, the CPU 10 determines whether or not to end the game. The determination of step S40 is made on the basis of, for example, whether or not the game is over or the user has provided an instruction to cancel the game. When the determination result of step S40 is negative, the process of step S32 is performed again. On the other hand, when the determination result of step S40 is affirmative, the CPU 10 ends the game process shown in FIG. 17. Thereafter, a series of processes of steps S32 to S40 are repeated until a determination to end the game is made in step S40.

As described above, in the above game process, the timing of transmitting the terminal game image to the terminal device 7 is delayed by the image standby time set in the image delay measurement process. Also, the timing of transmitting the terminal game sound to the terminal device 7 is delayed by the sound standby time set in the sound delay measurement process. Thus, the television 2 and the terminal device 7 can be synchronized in terms of game image display and game sound output.

Note that in the above example embodiment, to delay the timing of transmitting the terminal game image, the generated game image is put into temporary storage (step S35). Here, in another example embodiment, the CPU 10 may put data for use in game image generation, rather than the game image itself, into temporary storage. In this case, the CPU 10 generates and transmits the terminal game image after a lapse of the image standby time. Alternatively, in another example embodiment, a compressed game image may be put into temporary storage.

Furthermore, in the above example embodiment, to delay the timing of transmitting the terminal game sound, the sound generation instruction data is put into temporary storage (step S36). Here, in another example embodiment, the CPU 10 may generate sound data in step S36, and put the sound data into temporary storage. Alternatively, in another example embodiment, compressed game sound may be put into temporary storage.

[7. Variants]

The above example embodiment is merely illustrative, and in another example embodiment, a game system can be carried out with, for example, a configuration as will be described below.

(Variant Related to the Image and Sound Synchronization)

In the above example embodiment, the television 2 and the terminal device 7 are synchronized in terms of both the game images and the game sound. Here, synchronization simply for the game images or the game sound might suffice depending on the content of the game. Thus, in another example embodiment, the game apparatus 3 may achieve synchronization in terms of only either the game images or the game sound.

(Variant in which a Delay is Estimated from Another Delay)

Depending on the model of the television 2, the image to be displayed on the screen can be synchronized with the sound to be outputted from the speakers 2a. In the case where such a television is used, the game apparatus 3 may measure only one of the image delay time and the sound delay time, and estimate the other delay time to be the same as the measured delay time. Specifically, the game apparatus 3 may delay the timing of outputting the terminal game sound to the terminal device 7 by setting the sound standby time (or the sound delay time) on the basis of the image delay time without measuring the sound delay time. Alternatively, the game apparatus 3 may delay the timing of outputting the terminal game image to the terminal device 7 by setting the image standby time (or the image delay time) on the basis of the sound delay time without measuring the image delay time.

(Variant in which the Television Image and the Television Sound are Synchronized)

In the above example embodiment, the image delay time and the sound delay time of the television 2 are measured for the purpose of synchronization between the television 2 and the terminal device 7. Here, in another example embodiment, the delay measurement method in the above example embodiment can be used for any other applications not limited to the application for synchronization between the television 2 and the terminal device 7. For example, depending on the model of the television 2, the image to be displayed on the screen is not synchronized with the sound to be outputted from the speakers 2a, so that the image and its corresponding sound are outputted at different times. In the case where such a television is used, the game apparatus 3 may use the image delay time and the sound delay time to achieve synchronization between the television game image and the television game sound.

Figure 18:
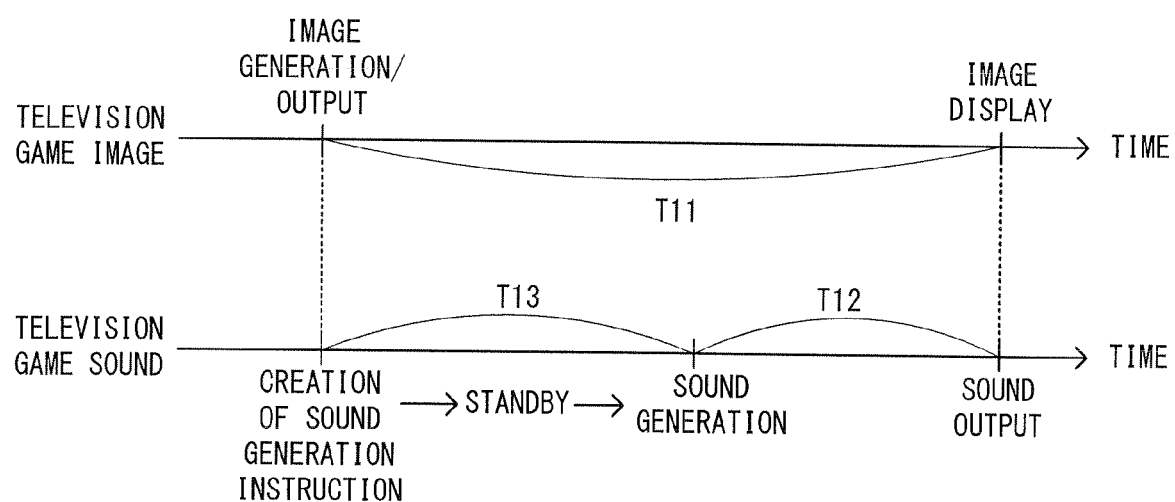
FIG. 18 is a diagram illustrating a process flow where a television game image and a television game sound are outputted in a variant of an example embodiment.

FIG. 18 is a diagram illustrating a process flow where the television game image and the television game sound are outputted in a variant of the present example embodiment. Referring to FIG. 18, the process for achieving synchronization between the television game sound and the television game image will be described taking as an example a case where the timing of displaying the television game image is delayed from the timing of outputting the television game sound.

In FIG. 18, image delay time T11 is longer than sound delay time T12. Accordingly, if the game apparatus 3 outputs a game sound and a game image at the same time, the television 2 has a lag between output of the game sound and output (display) of the game image. The lag between the game image and the game sound might cause the player to be provided with a feeling of unnaturalness. Accordingly, in the present variant, as shown in FIG. 18, the game apparatus 3 calculates time (referred to as "difference time") by deducting sound delay time T12 from image delay time T11, and delays the timing of outputting the television game sound by the difference time. Thus, it is possible to match the timing of displaying the television game image with the timing of outputting the television game sound, thereby preventing the player from being provided with a feeling of unnaturalness.

Figure 19:
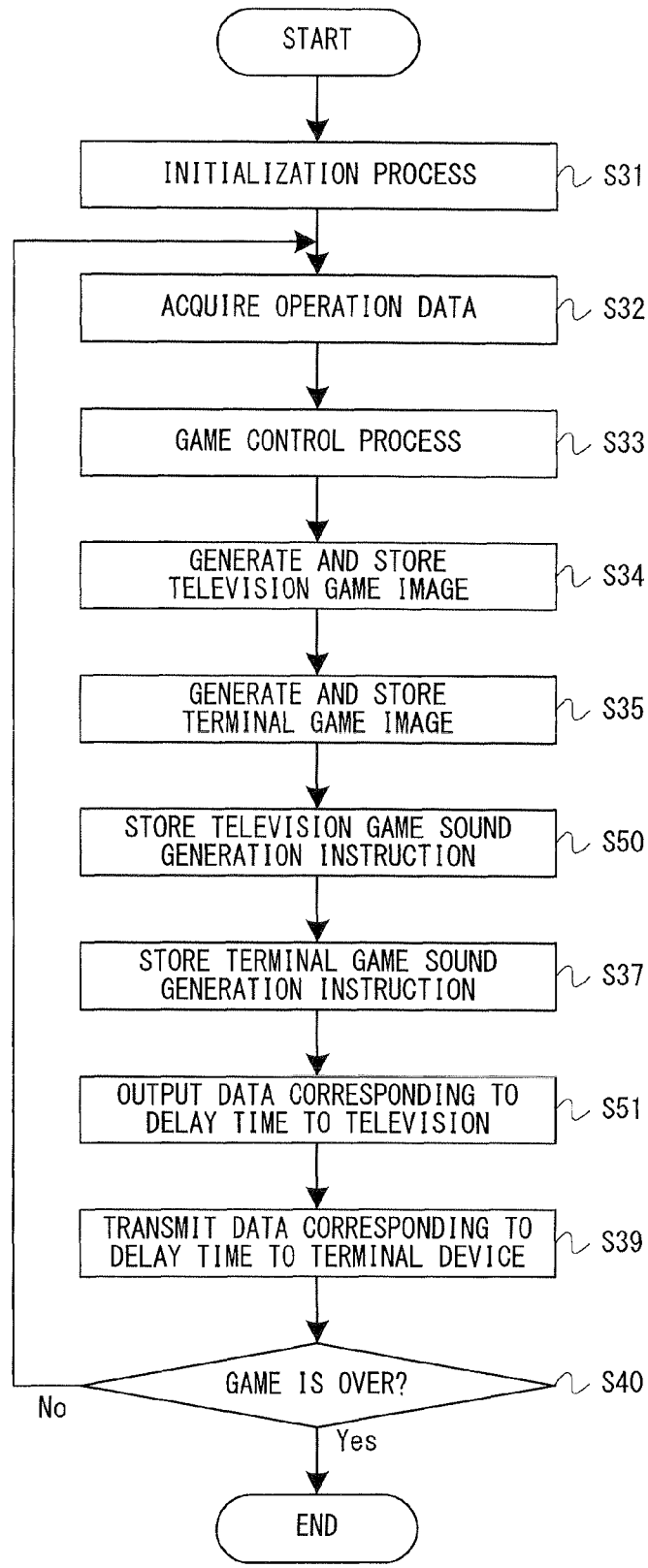
FIG. 19 is a flowchart illustrating a flow of a game process in the variant shown in FIG. 18.

FIG. 19 is a flowchart illustrating a flow of the game process in the variant shown in FIG. 18. Note that in FIG. 19, the same processing as that shown in FIG. 17 is denoted by the same step number as in FIG. 17, and any detailed description thereof will be omitted.

In FIG. 19, the processes of steps S31 to S35 are performed, as in the above example embodiment. Following step S35, the process of step S50 is performed. In step S50, the CPU 10 creates a sound generation instruction to generate a television game sound to be outputted to the speakers 2a of the television 2. Data for the created sound generation instruction is stored to the main memory. Following step S50, the process of step S37 is performed.

Furthermore, in the present variant, the process of step S51 is performed after step S37. In step S51, the CPU 10 transmits a game image and a game sound to the television 2 in accordance with the image standby time and the sound standby time. Concretely, as for the game image, the CPU 10 outputs the latest television game image generated in step S34 to the television 2. On the other hand, as for the game sound, the CPU 10 sends to the DSP 11c the sound generation instruction that has been stored for the difference time since step S50, thereby causing the DSP 11c to generate a television game sound. As a result, the television 2 has synchronization between the game image being displayed on the screen and the game sound being outputted from the speakers 2a. Note that the process in which the television game image and the television game sound are outputted from the game apparatus 3 to the television 2 is the same as in the above example embodiment. Following step S51, the process of step S39 is performed.

Note that in step S39 of the present variant, the CPU 10 may perform the same process as in the above example embodiment, but to deal with delayed output of the television game sound, the timing of outputting the terminal game sound may be adjusted to achieve synchronization with the television game sound. Concretely, the CPU 10 may send to the DSP 11c the sound generation instruction that has been stored for the image standby time (the sum of the sound standby time and the difference time) since step S37, thereby causing the DSP 11c to generate the terminal game sound. Thus, in the present variant also, the television game sound and the terminal game sound can be synchronized.

While the above variant has been described taking as an example the case where the timing of displaying the television game image is delayed from the timing of outputting the television game sound, even in the case where the timing of outputting the television game sound is delayed from the timing of displaying the television game image, synchronization can be achieved by a process similar to that of the variant. Specifically, where the timing of outputting the television game sound is delayed from the timing of displaying the television game image, the CPU 10, in step S51, outputs to the television 2 the television game image that has been stored in the VRAM 11d for the difference time since its generation in step S35. In this case, as for the game sound, the CPU 10 generates a television game sound in step S36 following step S35, and outputs the television game sound to the television 2 in step S51, as in the above example embodiment. In this manner, to achieve synchronization between the game image to be displayed on the television 2 and the game sound to be outputted from the speakers 2a of the television 2, the CPU 10 may delay at least one of the timing of outputting the game sound by the game apparatus 3 and the timing of outputting the game image by the game apparatus 3 on the basis of the image delay time and the sound delay time.

Furthermore, in the above variant, the game apparatus 3 achieves synchronization not only between the game image and the game sound of the television 2 but also between the television 2 and the terminal device 7. Here, in another example embodiment, synchronization may be achieved between the game image and the game sound of the television 2 but not between the television 2 and the terminal device 7. That is, the delay measurement method of the present example embodiment may be used solely for the purpose of synchronization between the game image and the game sound of the television 2.

(Variant Related to the Application of the Delay Measurement Method)

In the game, some game operations might be required to meet strict timing in accordance with game image display and/or game sound output. Accordingly, the delay measurement method of the above example embodiment is effective for use in game applications, such as game apparatuses, game systems, and game programs. However, the delay measurement method of the above example embodiment can be applied not only to game applications but also to cases where the television 2 and the terminal device 7 display arbitrary images and/or output arbitrary sounds. While the above example embodiment has also been described taking the television 2 as an example of the display device in which video processing is performed, for example, to enhance the quality of input images, the delay measurement method of the above example embodiment can be applied to any display devices capable of such video processing.

(Variant Related to the Configuration of the Delay Measurement System)

In the above example embodiment, the game system 1 including two display devices (the television 2 and the terminal device 7), one game apparatus 3, and one controller 5 has been described as an example of the delay measurement system for measuring display delays of display devices. Here, the game system 1 simply includes one game apparatus 3 and one portable display device (terminal device 7). That is, a general-purpose television can be used as the television 2, and is not included in the game system 1 along with the game apparatus 3 and the terminal device 7. In addition, the game system 1 may include a plurality of controllers 5 as operating devices or may include no controller 5.

Furthermore, in another example embodiment, the game apparatus may be provided in plurality. In this case, a series of information processing to be performed in the game system 1 may be performed by a specific one of the game apparatuses or may be shared between the game apparatuses. In addition, the display devices (the television 2 and the terminal device 7) may communicate with a specific one of the game apparatuses or their respective game apparatuses.

(Variant Related to the Information Processing Apparatus for Performing the Game Process)

In the above example embodiment, a series of information processing to be performed in the game system 1 are performed by the game apparatus 3, but the series of information processing may be performed in part by another apparatus. For example, in another example embodiment, apart (e.g., the terminal game image generation process) of the series of information processing may be performed by the terminal device 7. Moreover, in another example embodiment, in a game system including a plurality of information processing apparatuses capable of communicating with each other, a series of information processing as mentioned above may be shared between the information processing apparatuses.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present example embodiment can be used as, for example, a game system, apparatus, or program for the purpose of, for example, measuring a delay in outputting an image or sound to a display device such as a television or solving or reducing any problem due to such a delay.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising a game apparatus and a portable display device, wherein, the game apparatus includes:
    an image generator configured to sequentially generate first game images and second game images on the basis of a game process;
    an image output configured to sequentially output the first game images to a predetermined display device different from the portable display device;
    an image compressor configured to sequentially compress the second game images to sequentially generate compressed image data; and
    an image transmitter configured to sequentially transmit the compressed image data to the portable display device in a wireless manner,
    the portable display device includes:
        an image pickup device;
        an image receiver configured to sequentially receive the compressed image data from the game apparatus;
        an image decompressor configured to sequentially decompress the compressed image data to acquire the second game images;
        a display configured to sequentially display the second game images acquired through the decompression by the image decompressor; and
        an imaging data transmitter configured to transmit compressed imaging data to the game apparatus, the compressed imaging data being obtained by compressing a pickup image acquired by the image pickup device, and
    the game apparatus further includes:
        an imaging data receiver configured to receive and decompress the compressed imaging data to acquire the pickup image;
        an image determination device configured to determine whether or not the pickup image acquired through the decompression by the imaging data receiver includes a predetermined first game image;
        an image delay calculator configured to, when the pickup image is determined to include the predetermined first game image, calculate an image delay time between the image output outputting the predetermined first game image and the predetermined display device displaying the predetermined first game image, on the basis of the time of the determination, the time of the output of the predetermined first game image by the image output, and a processing time between the acquisition of the pickup image by the image pickup device and the determination; and
        an image transmission controller configured to delay the timing of transmitting the second game images to the portable display device, on the basis of the image delay time.

2. The game system according to claim 1, wherein,
the predetermined display device includes a speaker,
the game apparatus further includes:
    a sound generator configured to generate a first game sound and a second game sound on the basis of the game process;
    a sound output configured to output the first game sound to the predetermined display device; and
    a sound transmitter configured to wirelessly transmit the second game sound to the portable display device,
the portable display device includes:
    a sound receiver configured to receive the second game sound from the game apparatus;
    a speaker configured to output the second game sound;
    a microphone; and
    a detected sound transmitter configured to transmit a sound detected by the microphone to the game apparatus, and
the game apparatus further includes:
    a detected sound receiver configured to receive the detected sound;
    a sound determination device configured to determine whether or not the detected sound received by the detected sound receiver includes a predetermined first game sound;
    a sound delay calculator configured to, when the detected sound is determined to include the predetermined first game sound, calculate a sound delay time between the sound output outputting the predetermined first game sound and the speaker of the predetermined display device outputting the predetermined first game sound, on the basis of the time of the determination, the time of the output of the predetermined first game sound by the sound output, and a processing time between the detection of the sound by the microphone and the determination; and a sound transmission controller configured to delay the timing of transmitting the second game sound to the portable display device, on the basis of the sound delay time.

3. The game system according to claim 1, wherein the image generator generates as the first game image or the second game image an image making a notification for prompting to direct the image pickup device of the portable display device toward a screen of the predetermined display device, and after the image is displayed on the predetermined display device or the portable display device, the image generator generates and displays the predetermined first game image on the predetermined display device.

4. The game system according to claim 1, wherein,
the game apparatus further includes storage memory capable of storing a plurality of second game images, and
the image transmission controller stores the second game images generated by the image generator to the storage memory, and causes the image transmitter to transmit the second game images after a lapse of a standby time based on the image delay time since their generation.

5. The game system according to claim 1, wherein the image transmission controller calculates a standby time until the second game image is transmitted to the portable display device, on the basis of the image delay time, and a time period between the second game image being generated and the portable display device displaying the second game image.

6. A game system comprising a game apparatus and a portable display device, wherein,
the game apparatus includes:
a sound generator configured to generate a first game sound and a second game sound on the basis of a game process;
a sound output configured to output the first game sound to a predetermined display device different from the portable display device, the predetermined display device including a speaker; and
a sound transmitter configured to wirelessly transmit the second game sound to the portable display device,
the portable display device includes:
a microphone;
a sound receiver configured to receive the second game sound from the game apparatus;
a speaker configured to output the second game sound; and
a detected sound transmitter configured to transmit a sound detected by the microphone to the game apparatus, and
the game apparatus further includes:
a detected sound receiver configured to receive the detected sound;
a sound determination device configured to determine whether or not the detected sound received by the detected sound receiver includes a predetermined first game sound;
a delay calculator configured to, when the detected sound is determined to include the predetermined first game sound, calculate a sound delay time between the sound output outputting the predetermined first game sound and the speaker of the predetermined display device outputting the predetermined first game sound, on the basis of the time of the determination, the time of the output of the predetermined first game sound by the sound output, and a processing time between the detection of the sound by the microphone and the determination; and a sound transmission controller configured to delay the timing of transmitting the second game sound to the portable display device, on the basis of the sound delay time.

7. An image display method to be performed in a game system including a game apparatus and a portable display device provided with an image pickup device, wherein,
the game apparatus, comprising at least one first computer processor, performs:
test image generation for generating a predetermined test image; and
test image output for outputting the test image to a predetermined display device different from the portable display device,
the portable display device, comprising at least one second computer processor, performs:
image pickup for acquiring a pickup image of a screen of the predetermined display device by an image pickup device; and
imaging data transmission for transmitting compressed imaging data to the game apparatus, the compressed imaging data being obtained by compressing the pickup image acquired by the image pickup device,
the game apparatus, comprising the at least one first computer processor, further performs:
imaging data reception for receiving and decompressing the compressed imaging data to acquire the pickup image;
image determination for determining whether or not the pickup image acquired through the decompression by the imaging data reception includes the test image;
image delay calculation for, when the pickup image is determined to include the test image, calculating an image delay time between the test image being outputted by the test image output and the predetermined display device displaying the test image, on the basis of the time of the determination, the time of the output of the test image by the test image output, and a processing time between the acquisition of the pickup image by the image pickup device and the determination;
game image generation for sequentially generating first game images and second game images on the basis of a game process;
game image output for sequentially outputting the first game images to the predetermined display device different from the portable display device;
image transmission control for delaying the timing of transmitting the second game images to the portable display device, on the basis of the image delay time;
image compression for sequentially compressing the second game images to sequentially generate compressed image data; and
image transmission for sequentially transmitting the compressed image data to the portable display device in a wireless manner, and
the portable display device, comprising the at least one second computer processor, further performs:
image reception for sequentially receiving the compressed image data from the game apparatus;
image decompression for sequentially decompressing the compressed image data to acquire the second game images; and
sequential display of the second game images acquired by the image decompression.

8. The image display method according to claim 7, wherein, the predetermined display device includes a speaker,
the game apparatus, comprising the at least one first computer processor, further performs:
test sound generation for generating a predetermined test sound; and
test sound output for outputting the test sound to the predetermined display device,
the portable display device, comprising the at least one second computer processor, further performs:
sound detection for detecting a sound by a microphone; and
detected sound transmission for transmitting the sound detected by the microphone to the game apparatus,
the game apparatus, comprising the at least one first computer processor, further performs:
detected sound reception for receiving the detected sound;
sound determination for determining whether or not the detected sound received by the detected sound reception includes the test sound;
sound delay calculation for, when the detected sound is determined to include the test sound, calculating a sound delay time between the test sound output and the speaker of the predetermined display device outputting the test sound, on the basis of the time of the determination, the time of the output of the test sound by the test sound output, and a processing time between the sound detection and the determination;
game sound generation for generating a first game sound and a second game sound on the basis of the game process;
first game sound output for outputting the first game sound to the predetermined display device;
sound transmission control for delaying the timing of transmitting the second game sound to the portable display device, on the basis of the sound delay time; and
sound transmission for wirelessly transmitting the second game sound to the portable display device, and
the portable display device, comprising the at least one second computer processor, further performs:
sound reception for receiving the second game sound from the game apparatus; and
second sound output for outputting the second game sound from the speaker.

9. The image display method according to claim 7, wherein the test image generation generates an image making a notification for prompting to direct the image pickup device of the portable display device toward a screen of the predetermined display device, and after the image is displayed on the predetermined display device or the portable display device, the test image generation generates and displays the test image on the predetermined display device.

10. The image display method according to claim 7, wherein,
the game apparatus includes storage memory capable of storing a plurality of second game images,
the image transmission control stores the second game images generated by the game image generation to the storage memory, and
the image transmission transmits the second game images after a lapse of a standby time based on the image delay time since their generation.

11. The image display method according to claim 7, wherein the image transmission control calculates a standby time until the second game image is transmitted to the portable display device, on the basis of the image delay time, and a time period between the second game image being generated and the portable display device displaying the second game image.

12. A sound output method to be performed in a game system including a game apparatus and a portable display device, wherein,
the game apparatus, comprising at least one first computer processor, performs:
test sound generation for generating a predetermined test sound; and
test sound output for outputting the test sound to a predetermined display device different from the portable display device, the predetermined display device including a speaker,
the portable display device, comprising at least one second computer processor, performs:
sound detection for detecting a sound by a microphone; and
detected sound transmission for transmitting the sound detected by the microphone to the game apparatus,
the game apparatus, comprising the at least one first computer processor, further performs:
detected sound reception for receiving the detected sound;
sound determination for determining whether or not the detected sound received by the detected sound reception includes the test sound;
sound delay calculation for, when the detected sound is determined to include the test sound, calculating a sound delay time between the test sound output and the speaker of the predetermined display device outputting the test sound, on the basis of the time of the determination, the time of the output of the test sound by the test sound output, and a processing time between the sound detection and the determination;
game sound generation for generating a first game sound and a second game sound on the basis of the game process;
first game sound output for outputting the first game sound to the predetermined display device;
sound transmission control for delaying the timing of transmitting the second game sound to the portable display device, on the basis of the sound delay time; and
sound transmission for wirelessly transmitting the second game sound to the portable display device, and
the portable display device, comprising the at least one second computer processor, performs:
sound reception for receiving the second game sound from the game apparatus; and
second sound output for outputting the second game sound from the speaker.

13. A game apparatus capable of communicating with a portable display device, comprising:
an image generator configured to sequentially generate first game images and second game images on the basis of a game process;
an image output configured to sequentially output the first game images to a predetermined display device different from the portable display device;
an image compressor configured to sequentially compress the second game images to sequentially generate compressed image data;
an image transmitter configured to sequentially transmit the compressed image data to the portable display device in a wireless manner;

an imaging data receiver configured to receive and decompress compressed imaging data to acquire a pickup image, the compressed imaging data being obtained by compressing a pickup image acquired by an image pickup device of the portable display device;

an image determination device configured to determine whether or not the pickup image acquired through the decompression by the imaging data receiver includes a predetermined first game image;

an image delay calculator configured to, when the pickup image is determined to include the predetermined first game image, calculate an image delay time between the image output outputting the predetermined first game image and the predetermined display device displaying the predetermined first game image, on the basis of the time of the determination, the time of the output of the predetermined first game image by the image output, and a processing time between the acquisition of the pickup image by the image pickup device and the determination; and an image transmission controller configured to delay the timing of transmitting the second game images to the portable display device, on the basis of the image delay time.

14. A game apparatus capable of communicating with a portable display device, comprising:

a sound generator configured to generate a first game sound and a second game sound on the basis of a game process;

a sound output configured to output the first game sound to a predetermined display device different from the portable display device, the predetermined display device including a speaker;

a sound transmitter configured to wirelessly transmit the second game sound to the portable display device;

a detected sound receiver configured to receive a sound detected by a microphone of the portable display device from the portable display device;

a sound determination device configured to determine whether or not the detected sound received by the detected sound receiver includes a predetermined first game sound;

a sound delay calculator configured to, when the detected sound is determined to include the predetermined first game sound, calculate a sound delay time between the sound output outputting the predetermined first game sound and the speaker of the predetermined display device outputting the predetermined first game sound, on the basis of the time of the determination, the time of the output of the predetermined first game sound by the sound output, and a processing time between the detection of the sound by the microphone and the determination; and a sound transmission controller configured to delay the timing of transmitting the second game sound to the portable display device, on the basis of the sound delay time.

* * * * *